(12) United States Patent
Carlson et al.

(10) Patent No.: US 7,873,862 B2
(45) Date of Patent: Jan. 18, 2011

(54) MAINTAINING A PRIMARY TIME SERVER AS THE CURRENT TIME SERVER IN RESPONSE TO FAILURE OF TIME CODE RECEIVERS OF THE PRIMARY TIME SERVER

(75) Inventors: Scott M. Carlson, Tucson, AZ (US); Stephen P. Cherniak, Bainbridge, NY (US); Donald Crabtree, Port Ewen, NY (US); Dennis J. Dahlen, Rhinebeck, NY (US); Noshir R. Dhondy, Saugerties, NY (US); Michel H. T. Hack, Cortlandt Manor, NY (US); Denise M. Sevigny, Wappingers Falls, NY (US); Judith A. Wierbowski, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 12/255,348

(22) Filed: Oct. 21, 2008

(65) Prior Publication Data
US 2010/0100761 A1     Apr. 22, 2010

(51) Int. Cl.
*G06F 11/00* (2006.01)
(52) U.S. Cl. .......................................... 714/4
(58) Field of Classification Search ................ 714/4
See application file for complete search history.

(56) References Cited

U.S. PATENT DOCUMENTS

| | | | |
|---|---|---|---|
| 4,894,846 A | 1/1990 | Fine | |
| 5,481,258 A | 1/1996 | Fawcett et al. | |
| 5,602,992 A | 2/1997 | Danneels | |
| 5,689,688 A | 11/1997 | Strong et al. | |
| 5,784,421 A | 7/1998 | Dolev et al. | |
| 5,812,749 A * | 9/1998 | Fernandez et al. | 714/4 |
| 5,848,028 A | 12/1998 | Burklin | |
| 5,925,107 A | 7/1999 | Bartfai et al. | |

(Continued)

FOREIGN PATENT DOCUMENTS

WO     01/95550 A2     12/2001

(Continued)

OTHER PUBLICATIONS

J. Burbank et al., "The Network Time Protocol Version 4 Protocol Specification; draft-ietf-ntp-ntpv4-proto-02.txt", IETF Standard-Working-Draft, Internet Engineering Task Froce, IETF, CH, vol. ntp, No. 2, Mar. 2006, XP015045008, ISSN: 0000-0004.

(Continued)

*Primary Examiner*—Bryce P Bonzo
(74) *Attorney, Agent, or Firm*—John E. Campbell; Blanches E. Schiller, Esq.; Heslin Rothenberg Farley & Mesiti P.C.

(57) ABSTRACT

A primary time server of a Coordinated Timing Network remains as current time server, even if time code information of the primary time server is unavailable. The primary time server receives the necessary or desired timing information from a secondary time server and uses that information to maintain time synchronization within the Coordinated Timing Network.

20 Claims, 12 Drawing Sheets

U.S. PATENT DOCUMENTS

| | | | |
|---|---|---|---|
| 5,968,133 | A | 10/1999 | Latham et al. |
| 6,173,023 | B1 | 1/2001 | Tanonaka et al. |
| 6,253,335 | B1 | 6/2001 | Nakajima et al. |
| 6,351,821 | B1 | 2/2002 | Voth |
| 6,535,491 | B2 | 3/2003 | Gai et al. |
| 6,606,362 | B1 | 8/2003 | Daizell et al. |
| 6,636,987 | B1 | 10/2003 | Ruffini |
| 6,697,382 | B1 | 2/2004 | Eatherton |
| 6,704,801 | B1 | 3/2004 | Minyard |
| 6,714,563 | B1 | 3/2004 | Kushi |
| 6,742,044 | B1 | 5/2004 | Aviani et al. |
| 6,748,451 | B2 | 6/2004 | Woods et al. |
| 6,754,171 | B1 | 6/2004 | Bernier et al. |
| 6,760,316 | B1 | 7/2004 | Hebsgaard et al. |
| 6,768,452 | B2 | 7/2004 | Gilkes |
| 6,819,682 | B1 | 11/2004 | Rabenko et al. |
| 6,895,189 | B1 | 5/2005 | Bedrosian |
| 7,139,346 | B2 | 11/2006 | Skahan, Jr. et al. |
| 7,146,504 | B2 * | 12/2006 | Parks et al. ............... 713/178 |
| 7,185,111 | B2 | 2/2007 | Fulghum et al. |
| 7,283,568 | B2 | 10/2007 | Robie, Jr. et al. |
| 7,356,725 | B2 | 4/2008 | Engler |
| 7,394,802 | B2 | 7/2008 | Jun et al. |
| 7,395,448 | B2 | 7/2008 | Smith |
| 7,454,648 | B2 | 11/2008 | Dahlen |
| 7,475,272 | B2 | 1/2009 | Carlson |
| 7,496,606 | B2 | 2/2009 | Hind et al. |
| 7,535,931 | B1 | 5/2009 | Zampetti et al. |
| 7,539,777 | B1 | 5/2009 | Aitken |
| 7,571,268 | B2 * | 8/2009 | Kern et al. ............... 710/74 |
| 7,617,410 | B2 | 11/2009 | Check et al. |
| 7,688,865 | B2 | 3/2010 | Carlson et al. |
| 7,689,718 | B2 | 3/2010 | Carlson et al. |
| 2002/0027886 | A1 | 3/2002 | Fischer et al. |
| 2002/0039370 | A1 | 4/2002 | Elliot |
| 2002/0073228 | A1 | 6/2002 | Cognet |
| 2002/0078243 | A1 | 6/2002 | Rich et al. |
| 2002/0131370 | A1 | 9/2002 | Chuah et al. |
| 2002/0131398 | A1 | 9/2002 | Taylor |
| 2003/0035444 | A1 | 2/2003 | Zwack |
| 2003/0048811 | A1 | 3/2003 | Robie et al. |
| 2003/0152177 | A1 | 8/2003 | Cahill-O'Brien |
| 2003/0235216 | A1 | 12/2003 | Gustin |
| 2004/0073718 | A1 | 4/2004 | Johannessen et al. |
| 2004/0076187 | A1 | 4/2004 | Peled |
| 2004/0125822 | A1 | 7/2004 | Jun et al. |
| 2004/0167990 | A1 | 8/2004 | Peer |
| 2005/0020275 | A1 | 1/2005 | Agrawala et al. |
| 2005/0033862 | A1 | 2/2005 | Blum |
| 2005/0135429 | A1 | 6/2005 | Bingham et al. |
| 2005/0169233 | A1 | 8/2005 | Kandala et al. |
| 2007/0058491 | A1 * | 3/2007 | Dahlen et al. ............... 368/46 |
| 2007/0086489 | A1 | 4/2007 | Carlson |
| 2007/0086490 | A1 | 4/2007 | Carlson |
| 2008/0028254 | A1 | 1/2008 | Smith |
| 2008/0059655 | A1 * | 3/2008 | Carlson et al. ............... 709/248 |
| 2008/0059808 | A1 | 3/2008 | Engler |
| 2008/0072096 | A1 | 3/2008 | Smith |
| 2008/0072097 | A1 | 3/2008 | Check |
| 2008/0162984 | A1 | 7/2008 | Kalra et al. |
| 2008/0183849 | A1 | 7/2008 | Carlson |
| 2008/0183877 | A1 * | 7/2008 | Carlson et al. ............... 709/228 |
| 2008/0183895 | A1 | 7/2008 | Carlson et al. |
| 2008/0183896 | A1 | 7/2008 | Carlson |
| 2008/0183897 | A1 | 7/2008 | Carlson |
| 2008/0183898 | A1 | 7/2008 | Carlson et al. |
| 2008/0183899 | A1 | 7/2008 | Carlson et al. |
| 2008/0184060 | A1 | 7/2008 | Carlson |
| 2008/0225897 | A1 | 9/2008 | Bryant et al. |
| 2009/0070618 | A1 * | 3/2009 | Dahlen et al. ............... 713/500 |
| 2009/0257456 | A1 | 10/2009 | Carlson et al. |
| 2009/0259881 | A1 | 10/2009 | Carlson et al. |
| 2010/0049818 | A1 | 2/2010 | Walker |
| 2010/0100761 | A1 | 4/2010 | Carlson et al. |
| 2010/0100762 | A1 | 4/2010 | Carlson et al. |

FOREIGN PATENT DOCUMENTS

| | | | |
|---|---|---|---|
| WO | 02/44877 | A1 | 6/2002 |
| WO | 03/036395 | A1 | 5/2003 |

OTHER PUBLICATIONS

D. L. Mills, "Internet Time Synchronization: The Network Time Protocol", IEEE Transactions on Communications, IEEE Service Center, Piscataway, NY, US, vol. 39, No. 10, Oct. 1, 1991, pp. 1482-1493, XP000275311, ISSN: 0090-6778.

L.S. Liang, "Time Server In Advanced Automation Local Area Network", Computer Standards Interfaces, Elsevier Sequoia, Lausanne,CH, vol. 6, No. 3, Jan. 1989, pp. 223-227, XP000112504, ISSN: 0920-5489.

Kadoch, Michael, "ATM Signalling: A Tutorial," Canadian Conference on Electrical and Computer Engineering—Congres Canadien En Genie Electrrique Et Informatique, vol. 1, Sep. 5, 1995; pp. 420-423, XP000618815; p. 421-p. 422.

Sun, Kun et al., "Fault-Tolerant Cluster-Wise Clock Synchronization for Wireless Sensor Networks," Jul.-Sep. 2005, IEEE Transactions on Dependable and Secure Computing, vol. 2, No. 3, pp. 177-189.

"z/Architecture Principles of Operation," IBM Publication No. SA22-7832-04, Fifth Edition, Sep. 2005.

"z/Architecture Principles of Operation," IBM Publication No. SA22-7832-05, Sixth Edition, Apr. 2007.

International Search Report and Written Opinion for PCT/EP2007/058910 dated Nov. 6, 2007.

International Search Report and Written Opinion for PCT/EP2008/050482 dated Apr. 24, 2008.

International Search Report and Written Opinion for PCT/EP2008/050524 dated May 27, 2008.

International Search Report and Written Opinion for PCT/EP2008/050620 dated May 13, 2008.

International Search Report and Written Opinion for PCT/EP2008/050726 dated Aug. 1, 2008.

International Search Report and Written Opinion for PCT/EP2008/050739 dated Sep. 11, 2008.

Office Action for U.S. Appl. No. 11/468,352 dated Dec. 18, 2008.

Office Action for U.S. Appl. No. 11/468,352 dated Jun. 1, 2009.

Final Office Action for U.S. Appl. No. 11/468,352 dated Oct. 27, 2009.

Office Action for U.S. Appl. No. 11/468,352 dated Apr. 21, 2010.

Office Action for U.S. Appl. No. 11/876,152 dated Oct. 15, 2009.

Office Action for U.S. Appl. No. 11/876,199 dated Oct. 26, 2009.

Office Action for U.S. Appl. No. 11/876,240 dated Oct. 26, 2009.

Final Office Action for U.S. Appl. No. 11/876,240 dated Mar. 19, 2010.

Office Action for U.S. Appl. No. 11/876,272 dated Oct. 16, 2009.

Office Action for U.S. Appl. No. 11/940,518 dated Oct. 15, 2009.

Final Office Action for U.S. Appl. No. 11/940,518 dated Apr. 2, 2010.

Office Action for U.S. Appl. No. 11/940,558 dated Sep. 3, 2009.

Office Action for U.S. Appl. No. 12/100,660 dated Jul. 8, 2010.

Office Action for U.S. Appl. No. 12/100,872 dated May 28, 2010.

U.S. Appl. No. 12/782,144 entitled "Server Time Protocol Control Messages and Methods," Carlson et al., filed May 18, 2010.

U.S. Appl. No. 12/748,539 entitled "Channel Subsystem Server Time Protocol Commands," Carlson et al., filed Mar. 29, 2010.

"z/Architecture-Principles of Operation," IBM Publication No. SA22-7832-06, Seventh Edition, Feb. 2008.

Office Action for U.S. Appl. No. 12/541,485 dated Oct. 12, 2010.

Office Action U.S. Appl. No. 12/792,144 dated Nov. 17, 2010.

Office Action for U.S. Appl. No. 12/100,872 dated Nov. 17, 2010.

Neville, Iain, "IBM System Z Technical Conference,"Apr. 2007, IBM Corporation.

Dhondy, Noshir, "Introduction to Server Time Protocol with IBM System and Technology Group,"Oct. 9-13, 2006.

"Server Time Protocol for IBM Z9 System, zSeries 990 and 890; Non-Raised-Floor Support for System z9 BC,"Oct. 2006.

* cited by examiner

SET PPS INFORMATION

300

| 302 | LENGTH | COMMAND CODE | 304 |
|---|---|---|---|
| | COMMAND TRANSACTION NUMBER | | 306 |
| | 310 — P | 312 — CTN ID — N0 | 314 — N1 | 308 |
| | PORT 0 PPS SOURCE IDENTIFIER | | 316 |
| 318 | PORT 0 PPS STRATUM | PORT 0 FLAGS | 320 |
| | PORT 0 PPS PRT DISPERSION | | 322 |
| | PORT 0 SKEW RATE | | 324 |
| | NTP0 CONSOLE DISPERSION | | 326 |
| | NTP0 PRIMARY REFERENCE TIME DISPERSION | | 328 |
| | NTP0 PRIMARY REFERENCE TIME OFFSET | | 330 |
| | NTP0 PRIMARY REFERENCE TIME TIMESTAMP | | 332 |
| | PORT 1 PPS SOURCE IDENTIFIER | | 334 |
| 336 | PORT 1 PPS STRATUM | PORT 1 FLAGS | 338 |
| | PORT 1 PPS PRT DISPERSION | | 340 |
| | PORT 1 SKEW RATE | | 342 |
| | NTP1 CONSOLE DISPERSION | | 344 |
| | NTP1 PRIMARY REFERENCE TIME DISPERSION | | 346 |
| | NTP1 PRIMARY REFERENCE TIME OFFSET | | 348 |
| | NTP1 PRIMARY REFERENCE TIME TIMESTAMP | | 350 |
| | PRIMARY REFERENCE TIME SOURCE ID | | 352 |

FIG. 3A

MAINTAINING A PRIMARY TIME SERVER AS THE CURRENT TIME SERVER IN RESPONSE TO FAILURE OF TIME CODE RECEIVERS OF THE PRIMARY TIME SERVER

TECHNICAL FIELD

This invention relates, in general, to coordinated timing networks, and in particular, to enabling a primary time server to remain as current time server of a coordinated timing network, even if the time code receivers of the primary time server fail.

BACKGROUND OF THE INVENTION

In a coordinated timing network, multiple distinct computing systems maintain time synchronization to form the Coordinated Timing Network (CTN). Systems in the Coordinated Timing Network employ a message based protocol, referred to as a Server Time Protocol (STP), to pass timekeeping information between the systems over existing high-speed data links. This enables the time of day (TOD) clocks at each system to be synchronized to the accuracy required in today's high-end computing systems. A computing system that provides an STP facility is referred to as a time server or server herein.

A server defined in a Coordinated Timing Network as a primary time server provides primary reference time for the Coordinated Timing Network. The server in a Coordinated Timing Network that determines Coordinated Server Time (CST) (an estimate of the time of day clock for the CTN) based on information from another server in the Coordinated Timing Network is referred to as a secondary time server. The primary time server may obtain its time from an external time source, such as time code receivers, which provide the means to synchronize the time of day clocks in a Coordinated Timing Network to a defined time standard.

Each time server may have one or more time code receivers associated therewith. Currently, when the time code receivers of a primary time server fail, the responsibility of current time server becomes that of a secondary time server, instead of the primary time server. While this may be acceptable in some circumstances; in others, it is not preferred because of the resulting configuration change.

SUMMARY OF THE INVENTION

Based on the foregoing, a need exists for a capability that enables the primary time server of a Coordinated Timing Network to remain as the current time server, even if one or more of its time code receivers fails. In particular, a need exists for a capability that enables a secondary time server to provide needed or desired timing information to the primary time server to enable the primary time server to retain its role as the current time server, instead of having a secondary time server assume the role of primary time server.

The shortcomings of the prior art are overcome and additional advantages are provided through the provision of a computer program product for facilitating the providing of timing information to primary time servers of coordinated timing networks. The computer program product comprises a storage medium readable by a processing circuit and storing instructions for execution by a computer for performing a method. The method includes, for instance, obtaining by a primary time server of a coordinated timing network time code information from a secondary time server; and employing by the primary time server the time code information from the secondary time server to provide time synchronization in the coordinated timing network, wherein the employing of the time code information from the secondary time server is in response to an indication that time code information of the primary time server is unavailable, and wherein the primary time server remains as current time server of the coordinated timing network, instead of having the secondary time server take over as the current time server.

Methods and systems relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3A depicts one example of a Set PPS Information request block, in accordance with an aspect of the present invention;

DETAILED DESCRIPTION OF THE INVENTION

In accordance with an aspect of the present invention, a primary time server retains responsibility as the current time server in a Coordinated Timing Network, even after failure of its time code receivers (i.e., external time source), loss of a PPS signal or unavailability of desired time code information, such as Pulse-Per-Second (PPS) information. The primary time server receives the needed timing information from a secondary time server employing its own time code receivers. The time code receivers of the secondary time server are proximate to the secondary time server (e.g., within the same building), but can be hundreds of kilometers (e.g., 200 kilometers) away from the primary time server.

The primary time server provides primary reference time for the Coordinated Timing Network. It provides the means to synchronize the time of day clocks in a CTN to a defined time standard and accuracy. Servers in a CTN that are in the synchronized state are assigned a value, referred to as a stratum level, that specifies the number of servers between it and a primary time server. A primary time server operates at a stratum level of 1; secondary time servers operate at a stratum level of 2 or above, which increases as the number of servers in the timing path to the stratum-1 increases. In general, the quality of timekeeping information decreases as the stratum level increases. A server that is unsynchronized is assigned a stratum level of 0.

The STP facility provides the procedures required to transmit, receive and process STP messages. STP messages are transmitted over one or more physical data links between servers. The data link that has been established between two servers is referred to as an STP path. The STP facility provides the facilities to establish and maintain STP paths.

Figure 1:
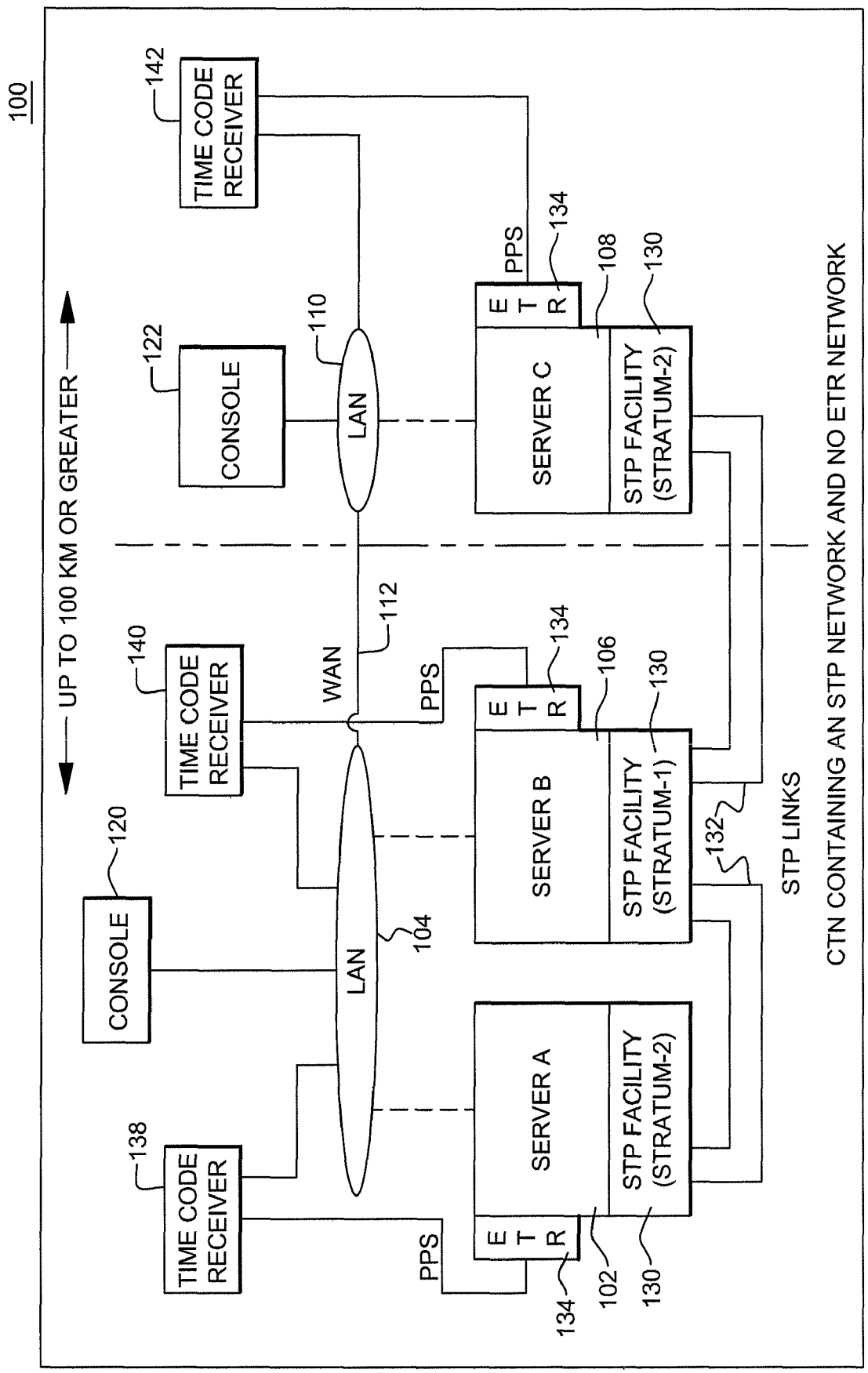
FIG. 1 depicts one example of a Coordinated Timing Network to incorporate and use one or more aspects of the present invention.

One example of a CTN configuration 100 is described with reference to FIG. 1. CTN configuration 100 includes, for instance, a Server A (102) coupled to a local area network (104), a Server B (106) coupled to local area network (104) and a Server C (108) coupled to a local area network (110). Each server is, for instance, a central processing complex (CPC) based on the z/Architecture® offered by International Business Machines Corporation. z/Architecture® is a registered trademark of International Business Machines Corporation, Armonk, N.Y., USA. One embodiment of the z/Architecture® is described in "z/Architecture Principles of Operation," IBM Publication No. SA22-7832-06, Seventh Edition, February 2008, which is hereby incorporated herein by reference in its entirety.

Local area network 104 is coupled to a console 120 and local area network 110 is coupled to a console 122, which are used in providing time synchronization within the network. Further, local area network 104 and local area network 110 are coupled to one another via a wide area network 112.

Each of the servers includes an STP facility 130, and each facility is coupled to one another via one or more STP links 132. Further, each server includes, for instance, two ports 134 (e.g., ETR ports) for receiving timing information. For instance, coupled to ports 134 of Server A is at least one time code receiver 138, which provides timing information to Server A; coupled to ports 134 of Server B is at least one time code receiver 140; and coupled to ports 134 of Server C is at least one time code receiver 142. Time code receivers 138 and 140 are coupled to console 120 via LAN 104, and time code receiver 142 is coupled to console 122 via LAN 110. Commercially available examples of time code receivers include Meinberg M300/GPS, Meinberg M600/GPS and Symmetricom S250. (Although in the above example, each server is coupled to a time code receiver, in other examples, one or more of the servers (e.g., a Stratum-2 server) may not be coupled to a time code receiver.)

In a CTN that is operating in pulse-per-second (PPS) mode, the primary time server (e.g., Server B in this example) receives a PPS signal from one or two time code receivers on one or two ports. If PPS signals are being supplied at two ports, then the port that has been specified by the user as the preferred port is the port that will be used by the primary time server for time synchronization within the CTN. If the preferred port were to fail and if the alternate port is active, the primary time server switches to the alternate port and remains in PPS mode. When both PPS ports are inactive at the primary time server or when a PPS mode failure has been detected at the primary time server, the primary time server resorts to using PPS information provided by a secondary time server.

In this example, Server B has a stratum level of 1, and Servers A and C have a stratum level of 2. The server that is to act as the active stratum-1 server in the network is specified as part of a stratum-1 configuration defined for the network. The stratum-1 configuration is maintained at each server of the network and provides information relating to the configuration of the network, including, for instance, the type of configuration defined for the network. The network can be configured as one of various types, including, for instance:

a) Null Configuration—In a null configuration, a stratum-1 server is not identified. The server remains unsynchronized until it attaches to a server that has a non-null stratum-1 configuration. The stratum-1 configuration at a server that is at stratum level 0 is equal to the null configuration when, for instance, it is not attached to any other server and the single CEC-CTN indicator in a stratum-1 configuration information block is zero. One example of a stratum-1 configuration information block is described in patent application U.S. Patent Publication No. 2008/0183895A1, entitled "Facilitating Synchronization of Servers in a Coordinated Timing Network," Carlson et al., published Jul. 31, 2008, which is hereby incorporated herein by reference in its entirety.

b) Single Server Definition—In a single server definition, the stratum-1 configuration defines a single primary stratum-1 server that acts as the active stratum-1 server for the CTN. The loss of the primary stratum-1 server results in the loss of synchronized time in the CTN until a new stratum-1 configuration is specified from the console.

A single server stratum-1 configuration may also include an indication that the specified stratum-1 server is the only server (e.g., central processing complex) in the CTN and that no other or additional servers will be part of the CTN. In this case, the CTN is referred to as a single CEC CTN. When a stratum-1 configuration indicates that it is a single CEC CTN, the configuration is a valid stratum-1 configuration for the initialized state of the server following a power on reset. When a single server stratum-1 configuration does not specify that it is a single CEC CTN, the configuration is not a valid stratum-1 configuration for the initialized state of the server following a power on reset and the stratum-1 configuration is set to the null configuration.

c) Dual Server Configuration—In a dual server configuration, the configuration includes a primary stratum-1 server and an alternate stratum-1 server. The use of a dual server configuration provides a mechanism for an alternate server to be able to take over the role of active stratum-1 server for the CTN. The alternate stratum-1 server, when configured with the same connectivity to other servers in the CTN as the primary stratum-1 server, can take over as the active stratum-1 without disruption to the synchronization capability of the CTN.

d) Triad Configuration—In a triad configuration, the stratum-1 configuration includes a primary stratum-1 server, an alternate stratum-1 server, and an arbiter server. The definition of a triad configuration provides a mechanism for an alternate server to be able to take over the role of active stratum-1 server for the CTN, as defined for a dual server configuration. Additionally, the definition of an arbiter server, when configured with connectivity to both the primary stratum-1 and alternate stratum-1 servers, provides a mechanism for the inactive stratum-1 and arbiter servers to communicate with each other to be able to determine that an active stratum-1 server failure has occurred and that the inactive stratum-1 should take over as the active stratum-1 server.

In the examples described herein, the stratum-1 server is the primary time server and the stratum-2 servers (one or more of them) are the secondary or backup time servers. The time servers, whether primary or secondary, receive timing information from their respective time code receivers. This information includes, for instance, pulse-per-second (PPS) offset and port information, associated dispersions and Network Time Protocol (NTP) information.

In accordance with an aspect of the present invention, secondary time servers send PPS information to the primary time server via an STP message command, referred to as the Secondary PPS Information (SPPS) message command. A secondary time server that is receiving PPS signals sends the command to the primary time server every PPS pulse, in this example. If a PPS pulse is not being received, the command includes NTP-only information. Then, the secondary servers send the command every x minutes, wherein, in one example, x equals 10. The primary time server is not required to request the information; instead, secondary time servers continually send the message command.

Figure 2:
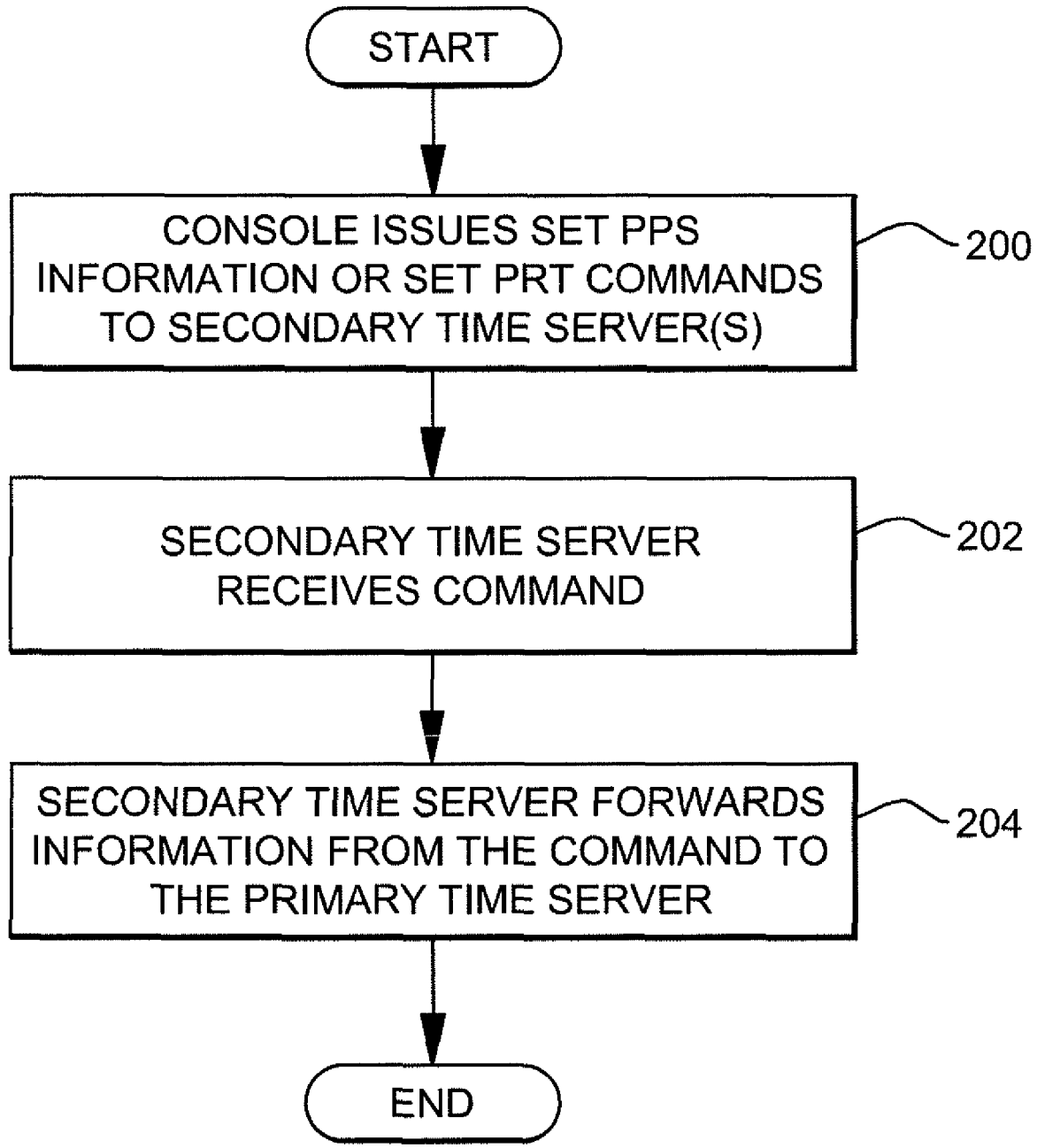
FIG. 2 depicts one embodiment of the logic associated with a secondary time server processing particular timing commands, in accordance with an aspect of the present invention.

Further details regarding the processing associated with forwarding the timing information from a secondary time server to the primary time server are described with reference to FIG. 2. This processing is performed by each secondary time server of the CTN (or a subset thereof in another example).

Initially, a console coupled to a secondary time server issues a Set PPS Information command or a Set PRT (Primary Reference Time) command to the secondary time server in order to provide an alternate path to the primary time server to obtain PPS and/or PRT information. When PPS information is available, the Set PPS Information command is used to transmit the PPS information to the secondary time server. On the other hand, when NTP-only information is available at the console, the Set PRT command is used to transmit the NTP information to the secondary time server.

The secondary time server receives the command, STEP 202, and forwards information from the command to the primary time server, STEP 204. In particular, a secondary time server that is at stratum-2 and has received a Set PPS Information or Set PRT command forwards the information from the command to the primary time server by sending the Secondary PPS Information message command to the primary time server. The Set PPS Information and Set PRT commands are issued by the console to secondary time servers at the same frequency at which they are issued to the primary time server. Further details regarding these commands are described below.

The Set PPS Information (SPI) command is a local command that provides information regarding PPS connections at the server receiving the command. The command is issued by the console to enable or disable PPS operation and to provide information regarding the operational characteristics of the PPS connections.

The command may also optionally provide PRT information. The PRT information provided is as described by the Set PRT command, described below. When PRT information is provided, the PRT source identifier equals PPSN; otherwise a PPS mode error is recognized.

The command, when issued to an inactive stratum-1 server, is a local command that provides primary reference time (PRT) information that may be used by the inactive stratum-1 server to verify the accuracy of the PPS signals it may be receiving and to have the information needed to takeover as the active stratum-1 server. The command does not result in any changes to the PRT source identifier or in the PRT steering.

PPS information may be provided for one or both ETR ports. A port data valid bit is associated with each ETR port and indicates whether the command request block includes valid PPS information for that port.

One example of a format of a command request block for the Set PPS Information command is depicted in FIG. 3A. As shown, a command block 300 includes, for instance:

Length 302: This field specifies a command block of e.g., 256 bytes.

Command Code 304: This field specifies the Set PPS Information command.

Command Transaction Number 306: This field includes a value (e.g., 32 bits) that is associated with the command being issued. The command transaction number is returned in the response block for the command.

CTN ID 308: This field includes the CTN ID of the CTN targeted for the command.

Port Preference Bit (P) 310: This field indicates the preferred PPS port to be used for PPS signaling. A value of 0 indicates ETR port 0 is the preferred port; a value of 1 indicates port 1 is the preferred port.

NTP0 PRT Information Valid (N0) 312: This field, when one, indicates the NTP PRT information in the fields designated by reference number 326-332 is valid. A value of zero indicates the PRT information is not valid.

NTP1 PRT Information Valid (N1) 314: This field, when one, indicates the NTP PRT information in the fields designated by reference number 344-350 is valid. A value of zero indicates the PRT information is not valid.

Port 0 PPS Source Identifier 316: This field, when valid, identifies the particular reference source for the PPS source. In the case of NTP stratum-0 (unspecified) or stratum-1 (primary) servers, this is, for instance, a four-character EBCDIC string, left justified and zero padded to 32 bits. When the PPS source is an NTP secondary server, the console sets this value to a four-character EBCDIC string containing SXXX, where XXX contains EBCDIC characters in the range of 002 to 999 that specify the stratum level of the secondary server (e.g., S002 for stratum 2, S003 for stratum 3, etc.). When the PPS source is an NTP primary (stratum 1) server, the console sets this value to the reference identifier provided by the NTP server converted from ASCII to EBCDIC. The following reference identifiers are currently defined for external reference sources. Codes for sources not listed can be selected by the PPS source as appropriate.

Port 0 PPS PRT Dispersion 322: This field, when valid, specifies the PPS-PRT dispersion of the PPS source connected to port 0. The value is, for instance, a 64-bit unsigned integer in which bit 63 has a resolution equal to bit 63 of the TOD clock. When the PPS source is a stratum-1 server, the value is set by the console according to the dispersion values shown in, for instance, the above table "Source Identifiers and Dispersions"; a value of zero is used to indicate the dispersion is

| Source Identifier | External Reference Source | Dispersion |
|---|---|---|
| LOCL | Uncalibrated local clock used as a primary reference for a subnet without external means of synchronization | not applicable |
| PPS | Atomic clock or other pulse-per-second source individually calibrated to national standards | unknown |
| ACTS | NIST dialup modem service | 15 milliseconds[1] |
| USNO | U.S. Naval Observatory modem service | 15 milliseconds (based on ACTS) |
| PTB | PTB (Germany) modem service | 15 milliseconds (based on ACTS) |
| TDF | Allouis (France) Radio 164 kHz (LF) | 15 milliseconds (Based on WWVB) |
| DCF | Mainflingen (Germany) Radio 77.5 kHz (LF) | 15 milliseconds (based on WWVB) |
| MSF | Rugby (UK) Radio 60 kHz (LF) | 15 milliseconds (based on WWVB) |
| WWV | Ft. Collins (U.S.) Radio 2.5, 5, 10, 15, 20 MHz (HF) | 20 milliseconds[1] |
| WWVB | Boulder (U.S.) Radio 60 kHz (LF) | 15 milliseconds[1] |
| WWVH | Kaui Hawaii (U.S.) Radio 2.5, 5, 10, 15 MHz (HF) | 20 milliseconds[1] |
| CHU | Ottawa (Canada) Radio 3330, 7335, 14670 kHz (HF) | 20 milliseconds (based on WWV/WWVH) |
| LORC | LORAN-C radio navigation system (LF) | 15 milliseconds (based on WWVB) |
| OMEG | OMEGA radio navigation system (service discontinued in 1997) | not applicable |
| GPS | Global Positioning Service | 150 nanoseconds |
| GOES | Geostationary Orbit Environment Satellite (service discontinued in 2004) | not applicable |
| CESM | Calibrated Cesium clock | unknown |
| RBDM | Calibrated Rubidium clock | unknown |
| FLY | Source is flywheeling on its local oscillator after having achieved synchronization | unknown |

[1]From "NIST Time and Frequency Services", special publication 432, 2002 edition, Michael Lombardi.

Port 0 PPS Stratum 318: This field, when valid, specifies the stratum level reported by the PPS source connected to port 0.

Port 0 Flags 320: This field includes the flags field for port 0 as defined below, in one example.

| Bit | Meaning |
|---|---|
| 0 | PPS Data Valid - The PPS data valid bit, when set to one, indicates that the information provided in the request block for this port, including the PPS enable bit, are valid and are to be stored in the PPS information block for this port. When the bit is zero, the information fields associated with this port do not contain valid data and are not stored in the PPS information block. |
| 1 | PPS Enable - The PPS enable bit, when set to one, requests that the port be enabled for PPS operation using the parameters provided in the fields designated by reference numbers 316-324. The manual port state for the ETR port is set to PPS attachment mode if not already in that state. When the bit is zero, the port is disabled for PPS operation. The manual port state for the ETR port is set to the disabled state. The PPS enable bit is only valid when the data valid bit for the port is one; otherwise, the bit is ignored. | unknown or is not applicable. When the PPS source is a secondary server, the value is set by the console to the equivalent of 100 milliseconds, in one example.

Port 0 Oscillator Skew Rate 324: This field, when valid, includes, for instance, a 32-bit unsigned binary integer that specifies the skew rate of the oscillator at the PPS source connected to port 0. The value has a resolution of one part per $2^{44}$. The field is set by the console to the skew rates listed below according to the oscillator in use at the PPS source:

Rubidium or better oscillator: skew rate set to the equivalent of 0.0001 ppm.

OCXO, TCXO or unknown oscillator: skew rate set to the equivalent of 2 ppm.

NTP0 PRT Information 326-332: When the NTP0 PRT Information valid bit is one, fields designated by reference number 326-332 include PRT information, as defined in the Set PRT command request block, described below, as calculated using the NTP interface to the PPS source 0.

Port 1 PPS Source Identifier 334: This field, when valid, specifies the reference source ID reported by the PPS source connected to port 1.

Port 1 PPS Stratum 336: This field, when valid, specifies the stratum level reported by the PPS source connected to port 1.

Port 1 Flags 338: This field includes the flags field for port 1, as defined below, in one example.

| Bit | Meaning |
|---|---|
| 0 | PPS Data Valid - The data valid bit, when set to one, indicates that the PPS information provided in the request block for this port, including the PPS enable bit, are valid and are to be stored in the PPS information block for this port. When the bit is zero, the information fields associated with this port do not contain valid data and are not stored in the PPS information block. |
| 1 | PPS Enable - The PPS enable bit, when set to one, requests that the port be enabled for PPS operation using the parameters provided in the fields designed by reference numbers 334-342. The manual port state for the ETR port is set to PPS attachment mode if not already in that state. When the bit is zero, the port is disabled for PPS operation. The manual port state for the ETR port is set to the disabled state. The PPS enable bit is valid when the data valid bit for the port is one; otherwise, the bit is ignored. |

Port 1 PPS PRT Dispersion 340: This field, when valid, specifies the PPS-PRT dispersion of the PPS source connected to port 1. The value is, for instance, a 64-bit unsigned integer in which bit 63 has a resolution equal to bit 63 of the TOD clock. When the PPS source is a stratum-1 server, the value is set by the console according to the dispersion values shown in the above table, "Source Identifiers and Dispersions"; a value of zero is used to indicate the dispersion is unknown or is not applicable. When the PPS source is a secondary server, the value is set by the console to the equivalent of 100 milliseconds, as an example.

Port 1 Oscillator Skew Rate 342: This field, when valid, includes a 32-bit unsigned binary integer that specifies the skew rate of the oscillator at the PPS source connected to port 1. The value has a resolution of one part per $2^{44}$. The field is set by the console to the skew rates listed below according to the oscillator in use at the PPS source:

Rubidium or better oscillator: skew rate set to the equivalent of 0.0001 ppm.

OCXO, TCXO or unknown oscillator: skew rate set to the equivalent of 2 ppm.

NTP1 PRT Information 344-350: When the NTP1 PRT information valid bit is one, these fields include PRT information as defined in the Set PRT command request block, described below, as calculated using the NTP interface to the PPS source 2.

PRT Source Identifier 352: This field includes the primary reference time source identifier for the CTN.

Figure 3B:
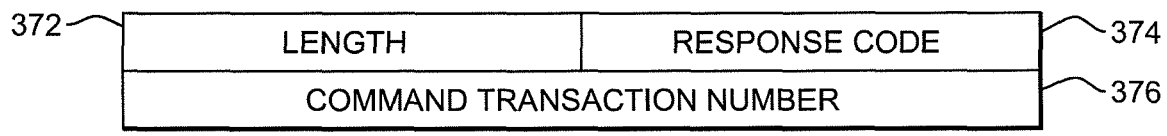
FIG. 3B depicts one example of a Set PPS Information response block, in accordance with an aspect of the present invention.

One example of a format of the SPI command response block is described with reference to FIG. 3B. In one example, an SPI command response block 370 includes, for instance:

Length 372: This field specifies a command block length of, for instance, 16 bytes.

Response Code 374: This field includes the response code for the command.

Command Transaction Number 376: This field includes the value provided in the command transaction number field of the command request block.

When the command request block includes the data valid bit equal to one for a port, the PPS information provided in the request block is copied to the PPS information block in the areas associated with the port. The data valid bit may be set for one or both ports in any given SPI command.

When the data valid bit and the enabled bit are both equal to one for a port, the manual port state in the CTN ID block for the port is set to the PPS attachment mode state if not already set to that state.

When the data valid bit is equal to one and the enabled bit is equal to zero for a port, the manual port state in the CTN ID block for the port is set to the disabled state. When both ports are put into the disabled state, a CTN parameter update procedure is performed to set the PRT source ID to CNTP for the CTN. An example of this procedure is described in U.S. Patent Publication No. 2008/0059655A1, entitled "Coordinated Timing Network Configuration Parameter Update Procedure," Carlson et al., published Mar. 6, 2008, which is hereby incorporated herein by reference in its entirety. Further, an STP event notification command is issued to the console with the event code set to "PPS mode terminated".

Figure 4A:
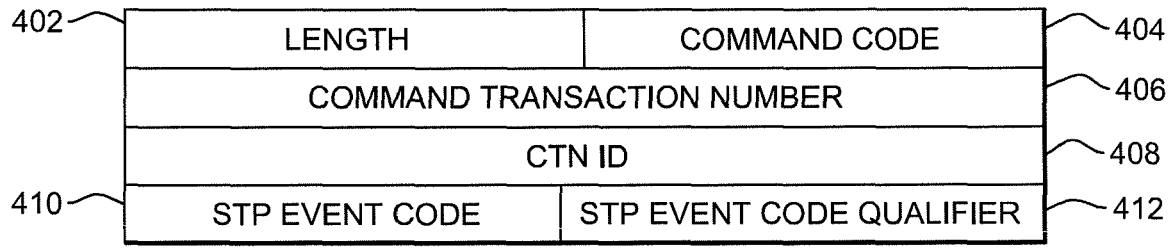
FIG. 4A depicts one embodiment of an STP Event Notification request block, in accordance with an aspect of the present invention.

An STP event notification command is used to notify the console of certain events that occur at an STP server, including step changes to the system TOD clock, changes to local time parameters, configuration changes and the generation of STP related machine check conditions. The event that is being reported is indicated by the STP event code provided in the request block. One example of an STP event notification command request block is described with reference to FIG. 4A. In one example, an STP event notification command request block 400 includes, for instance, the following:

Length 402: This field specifies a command block length of, for instance, 32 bytes.

Command Code 404: This field specifies the STP event notification command.

Command Transaction Number 406: This field includes a value that is associated with the command being issued. The command transaction number is returned in the response block for the command.

CTN ID 408: This field includes the CTN ID of the server sending the command.

STP Event Code 410: This field includes, for instance, an 8-bit code that specifies the STP event that is being reported. Unused codes are reserved. The field is defined as follows:

| Hex Bit | Meaning |
|---|---|
| 00 | System-TOD clock change: The system-TOD clock at the server has been modified as the result of a Set STP Controls command or a Modify TOD Clock console command. |
| 10 | Timezone control parameters change: The active timezone control parameters for the server have been modified. These parameters include the following: Active-timezone information Total-time offset. |
| 20 | Leap-seconds offset change: The active leap seconds offset for the server has been modified. |
| 30 | Clock source error: An STP clock source error machine check condition has been generated by the server. |
| 50 | Island condition: An island machine check condition has been generated by the server. |
| 5F | CTN ID change: The current CTN ID for the server has been changed and a configuration change notification command will not be issued as a result of the change. When the CTN ID change requires a configuration change notification command to be issued, the STP event notification command is not issued. |
| 60 | Stratum-1 configuration change: The current stratum-1 configuration for this server has been changed and a configuration change notification command will not be issued as a result of the change by this server. When the stratum-1 configuration change requires a configuration |

-continued

| Hex Bit | Meaning |
|---|---|
| | change notification command to be issued by the server, the STP event notification command is not issued. |
| 70 | ETR Migration Initiated: A modify CTN ID command has been performed that initiated the ETR migration procedure. |
| 80 | ETR Migration Completed: The ETR migration procedure has completed and the configuration is now a mixed-CTN configuration (i.e., the servers are configured to be part of an STP network and an External Time Reference (ETR) network). |
| 90 | ETR Migration Cancelled: A Set PRT command has been performed that cancelled ETR migration. |
| A0 | ETR Migration Error: An ETR switch to local condition was recognized during the ETR migration procedure. |
| B0 | PPS Event: A PPS related event was detected while operating in PPS mode. The STP event code qualifier field provides additional information regarding the event. |
| C0 | Log Data Successful: Log data requested by a previous request log data command has been successfully stored at the console. |
| D0 | Log Data Unsuccessful: Log data requested by a previous request log data command could not be successfully stored at the console. |
| F0 | Log Event: An event has occurred within the STP facility that requires a log to be taken. |

STP Event Code Qualifier 412: This field includes a qualifier for certain STP-event codes as defined below, in one example.

Stratum-1 configuration change qualifier: When the STP event code specifies a stratum-1 configuration change, this field includes the following information, as examples:

| Hex Bit | Meaning |
|---|---|
| 02 | The server sending the command is specified as the inactive stratum-1 server in the new stratum-1 configuration. |
| 03 | The server sending the command is specified as the arbiter server in the new stratum-1 configuration. |
| 04 | The server sending the command is not specified as the active stratum-1, the inactive stratum-1 server or the arbiter server in the new stratum-1 configuration. |

PPS event code qualifier: When the STP event code specifies a PPS event, this field includes the following information, as examples:

| Hex Bit | Meaning |
|---|---|
| 00 | PPS mode entered |
| 01 | PPS mode terminated due to ports disabled |
| 02 | PPS Port-0 state change |
| 03 | PPS Port-1 state change |
| 04 | PPS failure - loss of synch |
| 05 | PPS failure - timestamp mismatch |
| 06 | PPS failure - configuration error |
| 07 | PPS failure - PPS-PRT dispersion exceeds allowable dispersion |
| 08 | PPS port switch to port 0 |
| 09 | PPS port switch to port 1 |
| 0A | Inactive-stratum-1 PPS mode operational |
| 0B | Inactive-stratum-1 PPS mode not operational |
| 0C | PPS failure - jam synch |

Figure 4B:
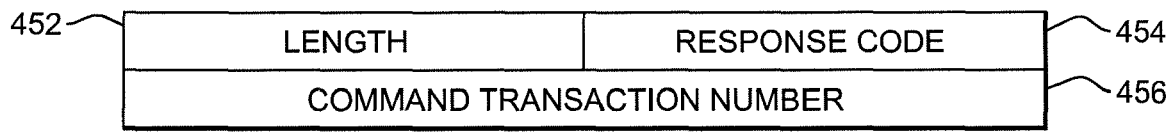
FIG. 4B depicts one embodiment of an STP Event Notification response block, in accordance with an aspect of the present invention.

One example of a command response block for the STP event notification command is described with reference to FIG. 4B. In one example, a response block 450 includes, for instance:

Length 452: This field specifies a command response block length of, for instance, 16 bytes.

Response Code 454: This field includes the response code for the command.

Command Transaction Number 456: This field includes the value provided in the command transaction number field of the command request block.

In addition to the Set PPS Information command issued to a time server, the Set Primary Reference Time (PRT) command is also issued. It may be issued to the primary time server and/or one or more secondary time servers. The Set Primary Reference Time command, when issued to the active stratum-1 server, is a global CTN update command that provides primary reference time (PRT) information that may be used by the STP facility to set the primary reference time source and associated primary reference time parameters. When it is issued to a secondary time server, it is a local command. The primary reference time source that is used by the STP facility is dependent on other time sources available to the STP facility and on the state of the STP facility. The primary reference time source and associated parameters being used at the STP facility are provided in the response block of a Read CTN Parameters command, an example of which is described in patent application U.S. Patent Publication No. 2008/0183895A1, entitled "Facilitating Synchronization of Servers in a Coordinated Timing Network," Carlson et al., published Jul. 31, 2008, which is hereby incorporated herein by reference in its entirety.

A global Set PRT command is rejected when ETR migration is in progress unless the cancel ETR migration bit is set in the command request. If the cancel ETR migration bit is one and ETR migration is not in process or cannot be canceled, the command is rejected and the migration not canceled condition is recognized. When the cancel ETR migration bit is one, the PRT source identifier, console dispersion, primary reference time dispersion, primary reference time offset and primary reference timestamp are set to zero; otherwise a cancel ETR migration parameter error is recognized.

The Set PRT command is rejected if the CTN is in PPS mode and the command provides a PRT source identifier other than CNTP. The CTN is removed from PPS mode by disabling both PPS ports using the Set PPS Information command.

The command is not acceptable when issued to a stratum-0 server and is rejected with a global command reject response code.

Figure 5:
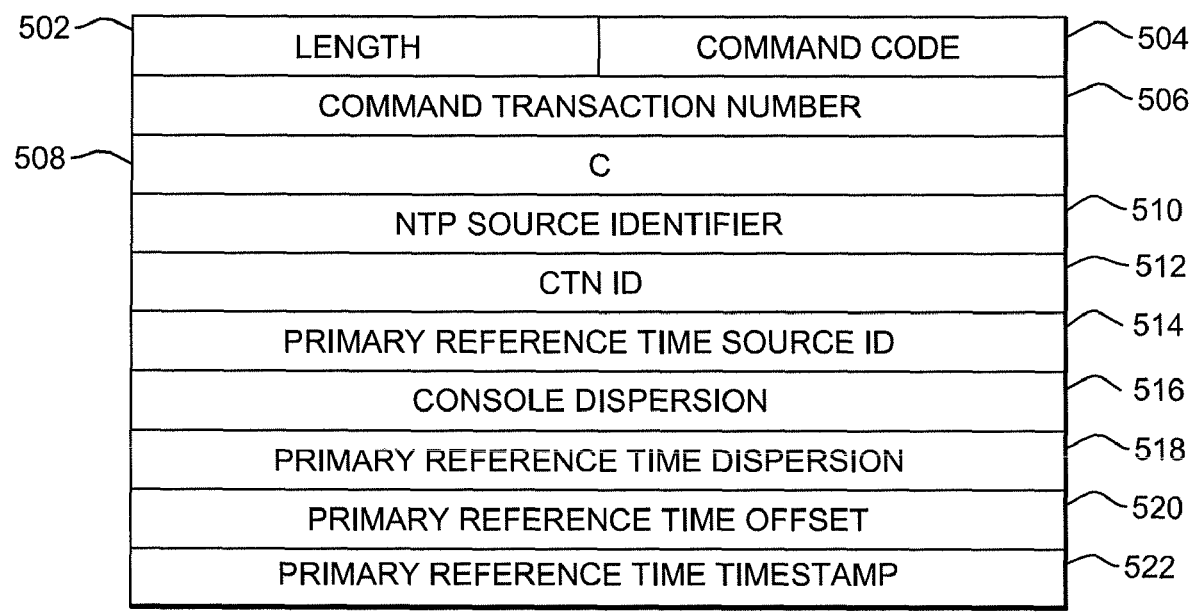
FIG. 5 depicts one embodiment of a Set Primary Reference Time command request block, in accordance with an aspect of the present invention.

One example of a command request block for the Set Primary Reference Time command is described with reference to FIG. 5. In one example, a command block 500 includes, for instance:

Length 502: This field specifies a command block length of, for instance, 64 bytes.

Command Code 504: This field specifies the Set Primary Reference Time command.

Command Transaction Number 506: This field includes a value (e.g., 32 bits) that is associated with the command being issued. The command transaction number is returned in the response block for the command.

Cancel ETR Migration (C) 508: This field, when one, indicates a request to cancel any ETR migration that is currently in progress. If ETR migration is not in progress or cannot be canceled, the command is rejected and the migration not canceled condition is recognized. When this bit is one, the PRT source identifier, console dispersion, PRT dispersion, PRT offset and primary reference timestamp are set to zero; otherwise a cancel ETR migration parameter error is recognized.

NTP Source Identifier 510: When the NTP server is an NTP primary (stratum-1) server, this value is set to the selected PPS source identifier from the SPI command or to the NTP source identifier in the Set PRT command.

When the PPS source is an NTP secondary server, the console sets this value to a four-character EBCDIC string containing SXXX, where XXX includes EBCDIC characters in the range of 002 to 999 that specify the stratum level of the secondary server (e.g., S002 for stratum 2, S003 for stratum 3, etc.).

CTN ID 512: This field includes the CTN ID of the CTN targeted for the command.

Primary Reference Time Source ID 514: This field identifies the source of the primary reference time provided.

Console Dispersion 516: This field includes a value indicating the dispersion between the primary reference time at the console and the active stratum-1 server. The value is, for instance, a 64-bit unsigned integer in which bit 63 has a resolution equal to bit 63 of the TOD clock. The value indicates the maximum possible error between the primary reference time at the active stratum-1 server that is due to console clock error relative to the active stratum-1 system TOD clock. A dispersion value equal to zero indicates the value is not known or is not applicable.

The console dispersion indicates the maximum error between the clock at the active stratum-1 server and the console's calculation of that clock. When in PPSN mode, because the PPS signal is used to calculate PRT offset, the console clock is not used to determine primary reference time at the active stratum-1 server and the console dispersion is set to zero in the PRT Correction Steering Information Block (PCSIB). (The PCSIB is the PRT correction steering component of the CTN parameter block that is kept up-to-date by the primary time server and circulated throughout the CTN by means of, for instance, the CTN parameter update procedure. The PCSIB includes, for instance, the NTP source identifier field, four of whose possible values are CNTP, CNTX, PPSN, and PPSX). Otherwise, the console dispersion is generally on the order of 10 milliseconds.

Primary Reference Time Dispersion 518: This field includes a value indicating the dispersion of the primary reference time at the console relative to the actual primary reference time. The value is, for instance, a 64-bit unsigned integer, in which bit 63 has a resolution equal to bit 63 of the TOD clock. The value indicates the maximum possible error of the primary reference time received at the console and the actual primary reference time. A value of zero indicates that the value is not known or is not provided.

Primary Reference Time Offset 520: This field includes the offset of the actual primary reference time relative to the active stratum-1 system TOD clock as calculated by the console at the time the most recent primary reference time information was received at the console. The value is, for instance, a 64-bit signed integer, in which bit 63 has a resolution equal to bit 63 of the TOD clock. The sum of the TOD clock at the active stratum-1 server and the primary reference time offset is the primary reference time for the CTN. The console dispersion plus the PRT dispersion represents the total dispersion of the CTN primary reference time relative to the actual primary reference time.

Primary Reference Time Timestamp 522: This field includes a timestamp indicating when the primary reference time was last obtained at the console. The field is in UTC-timestamp format.

Figure 6:
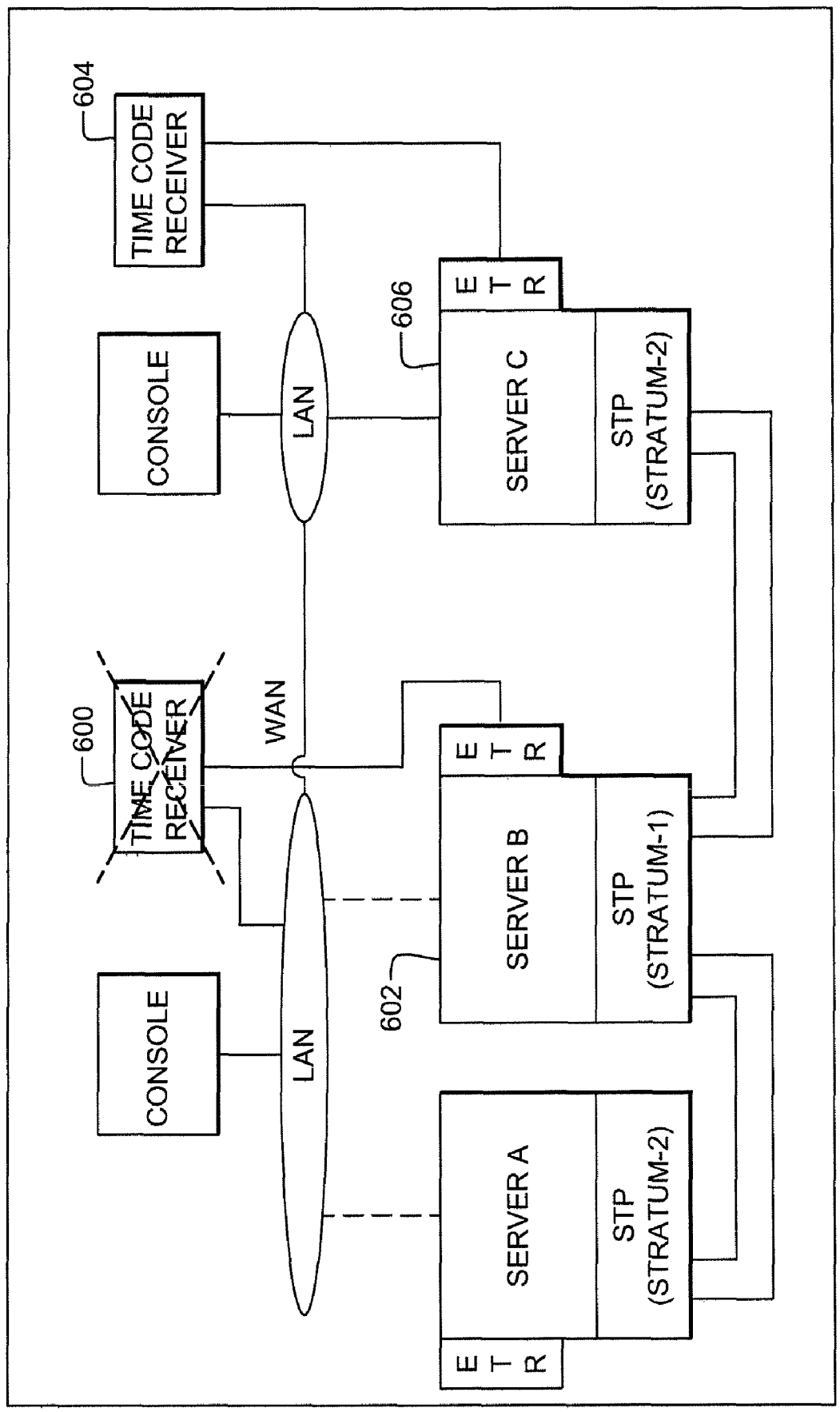
FIG. 6 depicts one example of a CTN in which the time code receiver(s) of the primary time server are not usable, and thus, timing information is provided by a secondary time server, in accordance with an aspect of the present invention.

Information obtained by a secondary time server from the Set PPS information or Set PRT command is provided from the secondary time server to the primary time server for use by the primary time server, if need be. For example, as depicted in FIG. 6, if the time code receiver(s) 600 of the primary time server (Server B) 602 fails, but at least one time code receiver 604 of a secondary time server, such as Server C 606, is functioning properly, then the information obtained by secondary time server 606 is forwarded to primary time server 602 and used by the primary time server. This is in lieu of the secondary time server taking over responsibility as the current time server. Any of the secondary time servers can provide this information. Further, as used herein, failure of a time code receiver includes failure of the receiver itself, inaccessibility to the information, even if the receiver seems to be working, and/or incorrect data being provided by the receiver, as examples.

In one example, the timing information obtained by the secondary time server is provided to the primary time server via a Secondary PPS (SPPS) Information message command. This command is an unsolicited STP message control operation that is issued by a secondary time server to notify the active stratum-1 server (i.e., the primary time server) of PPS information available at the secondary server. In one example, the secondary time server includes the following values in the command request block of the Secondary PPS Information message command:

The PPS-PRT dispersion for the PPS port being used at the secondary time server;

The PPS offset computed using the signals being received on the PPS port in use at the secondary time server;

The Coordinated Server Time (CST) dispersion at the secondary time server; and

The CST offset at the secondary time server.

A PPS-PRT dispersion is associated with each PPS port and represents the margin of error relative to the primary reference time (as specified by the reference source identifier) for the PPS signals being received on the PPS port in use at the secondary time server.

The term, "CST dispersion at the secondary time server" includes the absolute value of the CST offset at the secondary time server. Another component is the margin of error associated with the calculation of the CST offset value.

Figure 7:
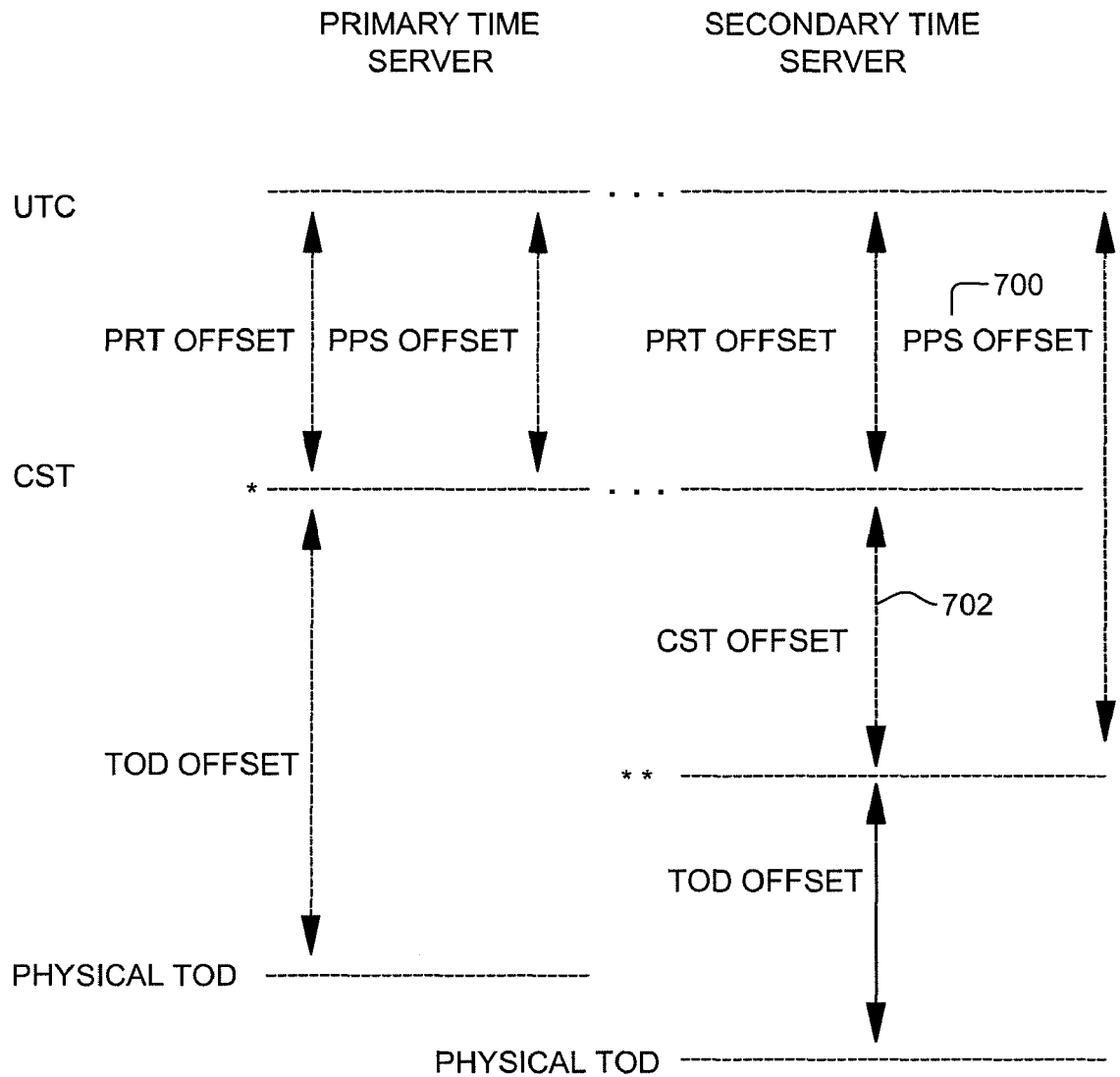
FIG. 7 depicts relationships of various time values for a primary time server and a secondary time server, in accordance with an aspect of the present invention.

The CST offset at the secondary time server is a signed value. This field is not present in the command request block of the Secondary PPS Information Message command, described below, but instead, referring to FIG. 7, the secondary time server adjusts the PPS offset 700 it sends to the primary time server by an amount equal to the CST offset 702 before writing the PPS offset in the command request block. Stated differently, the PPS offset the secondary time server sends to the primary time server is defined relative to CST and not relative to the secondary time server's logical TOD clock.

Figure 8:
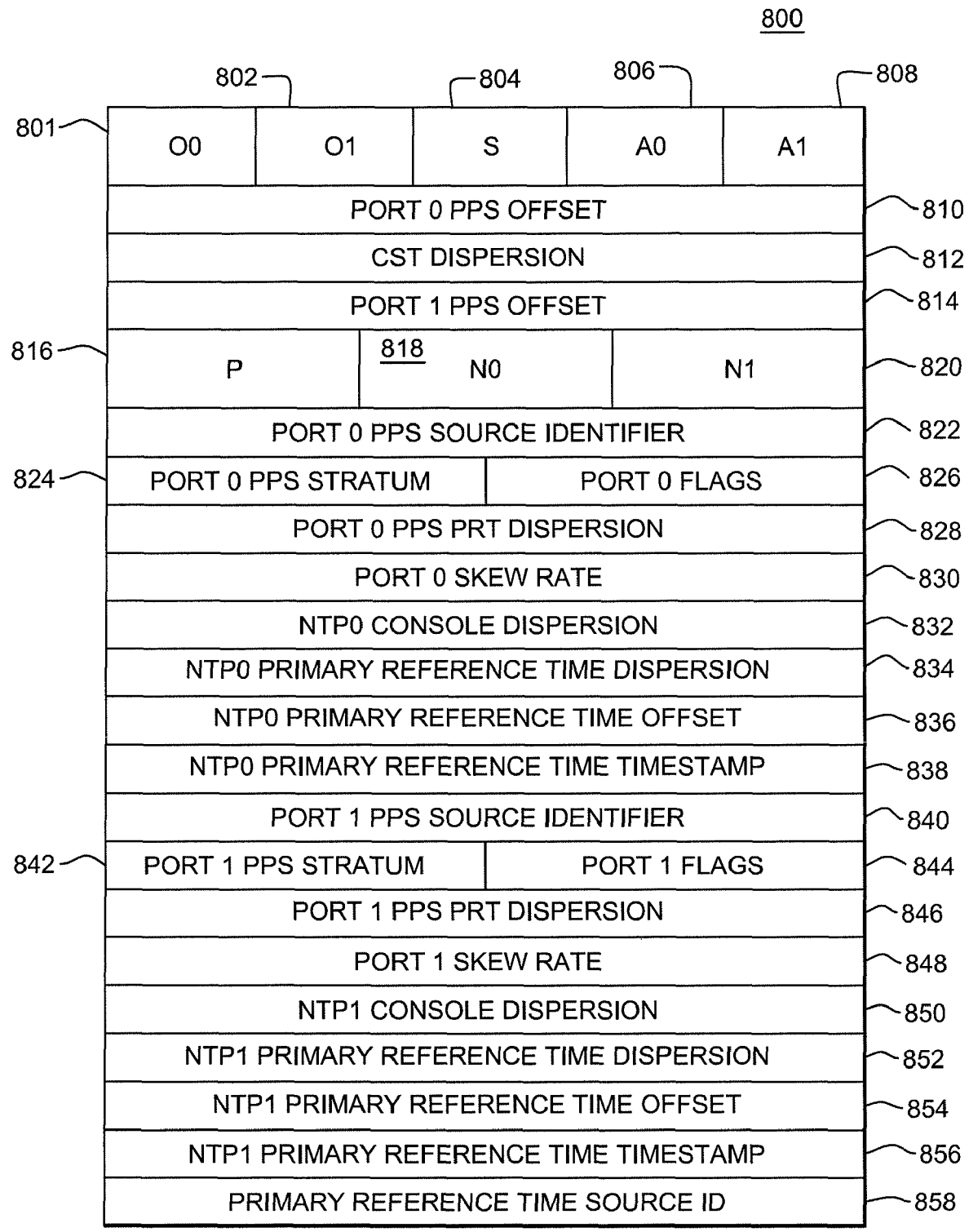
FIG. 8 depicts one embodiment of a message command operation dependent area of a Secondary PPS Information message command, in accordance with an aspect of the present invention.

One example of a message command operation dependent area (a.k.a., request block) for the Secondary PPS Information message command is described with reference to FIG. 8. In one example, a request block 800 includes the following:

Port 0 PPS Offset Valid (O0) 801: This field, when one, indicates there is a valid PPS offset for port 0 and the offset has been stored in the port 0 PPS offset field. A value of zero indicates the PPS port offset for port 0 is not valid and the content of the port 0 PPS offset field is meaningless.

Port 1 PPS Offset Valid (O1) 802: This field, when one, indicates there is a valid PPS offset for port 1 and the offset has been stored in the port 1 PPS offset field. A value of zero indicates the PPS port offset for port 1 is not valid and the content is meaningless.

Selected PPS Source (S) 804: When one or both PPS ports are specified as being in the active state in the SPPS message command, this field identifies the PPS port at the secondary server that is the selected PPS port for the secondary server. A value of zero indicates PPS port 0; a value of one indicates PPS port 1. When neither port is in the active state, the bit is meaningless.

PPS Port 0 Active (A0) 806: This field, when one, indicates that PPS port 0 at the secondary server is in the active state. A value of zero indicates the port is in the inactive state.

PPS Port 1 Active (A1) 808: This field, when one, indicates that PPS port 1 at the secondary server is in the active state. A value of zero indicates the port is in the inactive state.

PPS Port 0 Offset 810: This field is valid when the PPS port 0 offset valid bit is one and, when valid, includes, for instance, a 32-bit, signed binary integer equal to the secondary server PPS offset for port 0 minus the secondary server CST offset. The resolution of the value is, for instance, $2^{-12}$ microseconds. When the PPS port 0 offset valid bit is zero, this field is meaningless.

CST Dispersion 812: This field specifies the CST dispersion of the server sending the Secondary PPS Information message at the time the message was sent.

Port 1 PPS Offset 814: This field is valid when the port 1 PPS offset valid bit is one, and, when valid, includes, for instance, a 32-bit, signed binary integer equal to the secondary server PPS offset for port 1 minus the secondary server CST offset. The resolution of the value is, for instance, $2^{-12}$ microseconds. When the PPS port 1 offset valid bit is zero, this field is meaningless.

Fields defined by reference numbers 816-858 are the same as the fields 310-352 of FIG. 3A. When a secondary server receives a console SPI command, the server stores the information at fields 310-352 from the request block of the Set PPS Information command into the Secondary PPS Information message command request block.

When a secondary server receives a Set PRT command, the server stores the information at fields 510 and 514-522 (FIG. 5) from the request block of the Set PRT command into the Secondary PPS Information message command request block at fields 822, 858, 832-838, respectively.

The manner in which the secondary PPS information supplied to the primary time server by a secondary time server is used at the primary time server depends on the type of information, e.g., whether the information includes PPS port attachment information or NTP only information. This is described in further detail with reference to FIG. 9A.

In response to the primary time server receiving the secondary PPS information, STEP 900, and assuming that the primary time server is unable to use its PPS information, a determination is made as to whether the information provided by the secondary time server includes usable PPS information, INQUIRY 902. In one example, in order for the PPS information provided by a secondary time server to be considered valid at the primary time server, the PPS offset at the secondary time server is to be within, for instance, 250 milliseconds of the time being transmitted to the secondary time server by its external time source.

The 250 milliseconds or less criterion provides a high-level of confidence that the secondary time server providing the PPS information is in close enough synchronization with its external time source (e.g., time code receivers) that there can be no ambiguity regarding to which second the pulse it is receiving refers. The possible ambiguity in question can be understood in terms of the technique by which the PPS-PRT offset is computed.

To compute the PPS-PRT offset, a server analyzes the physical clock timestamp stored at each timestamp event (TSE). A server determines that a new TSE physical clock timestamp has been stored by monitoring the value at least every 64 milliseconds, in one example. When a new timestamp has been stored, the server converts the TSE physical clock timestamp to a TSE system TOD clock timestamp by adding the logical TOD clock offset at the TSE to the TSE physical clock timestamp. (In fact, only the physical clock timestamp is stored on a TSE. The value of the logical TOD clock offset at the TSE is estimated by computing the difference between the current physical clock value and the TSE physical clock timestamp and multiplying the result by the steering rate in effect during the interval. That delta is then subtracted from the current logical TOD clock offset to obtain a close approximation of the logical TOD clock offset at the instant the TSE occurred.) The resulting TSE system TOD clock timestamp is converted to seconds, and the fractional part of the result is used to determine the PPS-PRT offset, as follows:

If the fractional portion of the timestamp is less than 0.5 seconds, then the system TOD clock at the server has a PPS-PRT offset equal to the negative of the fractional portion.

If the fractional portion of the timestamp is equal to or greater than 0.5 seconds, then the system TOD clock has a PPS-PRT offset equal to one minus the fractional portion.

In one example, the PPS offset is not considered meaningful until the sum of the PRT dispersion, console dispersion and absolute value of the PRT offset for the PPS port is less than 0.25 seconds. When the PPS offset is considered to be meaningful and the absolute value of the PPS offset is less than 0.25 seconds, the PPS offset is referred to as a valid PPS offset and represents the offset to PRT. If the PPS offset is considered meaningful, but is equal to or greater than 0.25 seconds, a PPS port configuration error is recognized and a STP Event Notification command is issued to the console indicating a PPS event with the PPS event code qualifier set to PPS port configuration error.

Figure 9A:
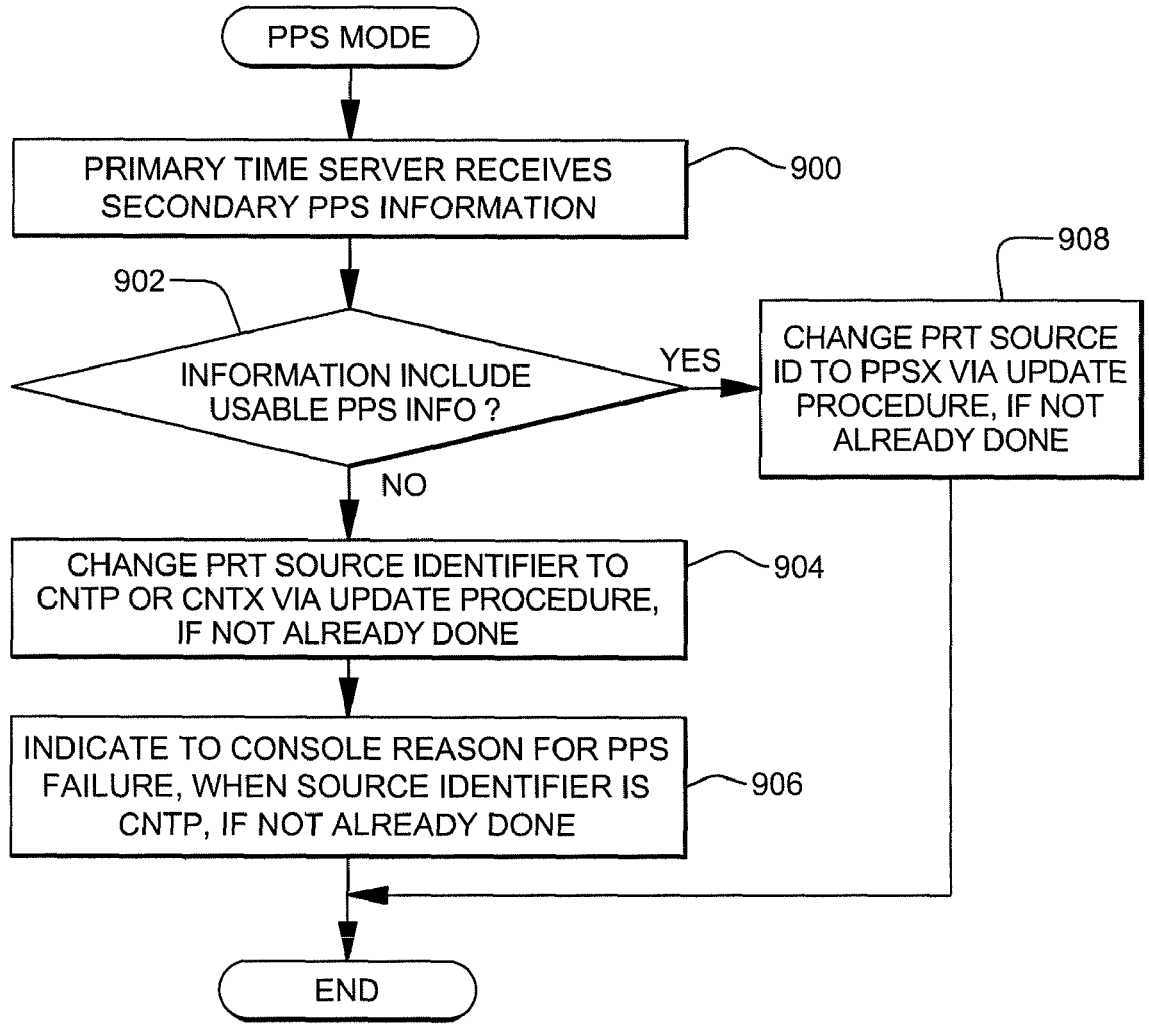
FIG. 9A depicts one embodiment of the logic associated with a primary time server processing secondary PPS information, in accordance with an aspect of the present invention.

Continuing with FIG. 9A, if the primary time server is forced to leave PPS mode because of a PPS failure and no usable PPS information is being forwarded to it by a secondary time server, the primary time server changes the PRT source identifier to CNTP or CNTX via, for instance, a CTN parameter update procedure, assuming this change has not already been made, STEP 904. CNTP is used if the console at the primary time server is still able to provide the primary time server, by means of the Set PRT command, with NTP information from whatever time code receiver might still be in operation at the primary time server location. CNTX is used if the only NTP information that is available is the NTP information forwarded to the primary time server from a secondary time server by means of the Secondary PPS Information message command. In CNTX mode, the Secondary PPS Information message command is sent by the secondary time server to the primary time server every x minutes (e.g., 10 minutes) or when a new console Set PPS Information command or a Set PRT command is received at the secondary time server, as examples. Further, an STP event notification command is issued to the console with the event code set to indicate the reason for the PPS failure, if it has not been previously sent, STEP 906.

If, on the other hand, usable PPS information is available to the primary time server in the form of data forwarded to the primary time server from a secondary time server by means of the Secondary PPS Information command, INQUIRY 902, then the primary time server remains in PPS mode, but nevertheless performs the CTN parameter update procedure to change the PRT source identifier from PPSN to PPSX, assuming it has not already been changed, STEP 908. In PPSX mode, the Secondary PPS Information message command is sent by the secondary time server to the primary time server following, for instance, each one second pulse received at the secondary time server.

The primary time server discontinues use of PPS information provided by a secondary time server when any of the following conditions occurs:

The secondary time server reports a PPS event that indicates the PPS mode has been terminated;

The secondary time server reports a PPS event that indicates that a PPS mode failure has occurred; or The primary time server has one or more active PPS ports that meet PPS mode requirements.

Figure 9B:
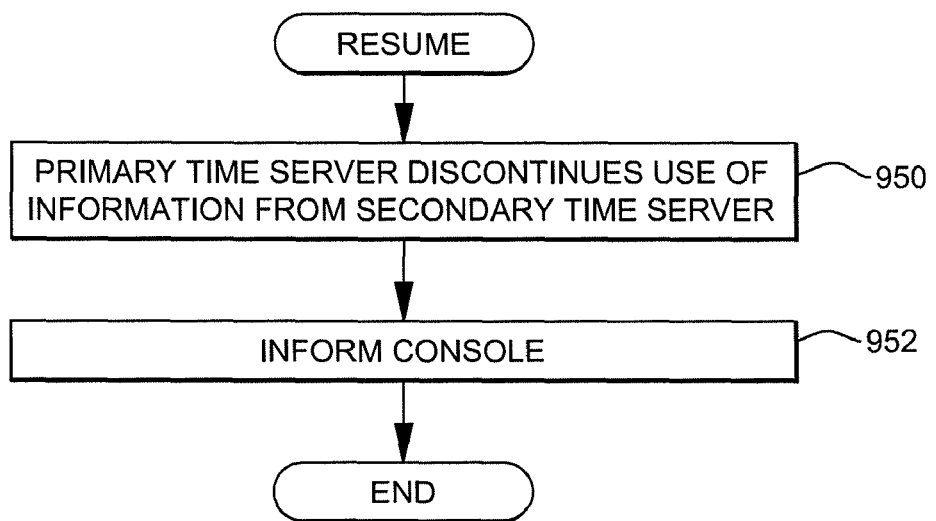
FIG. 9B depicts one embodiment of the logic associated with the primary time server discontinuing use of information from a secondary time server, in accordance with an aspect of the present invention.

Processing associated with the primary time server resuming use of PPS information provided by a time code receiver attached directly to the primary time server is described with reference to FIG. 9B. When the primary time server discontinues use of information from a secondary time server to determine PRT, STEP 950, the console is informed, STEP 952. In one example, an STP event notification command is issued to the console with the event code set to "secondary server PRT discontinued".

Figure 10A:
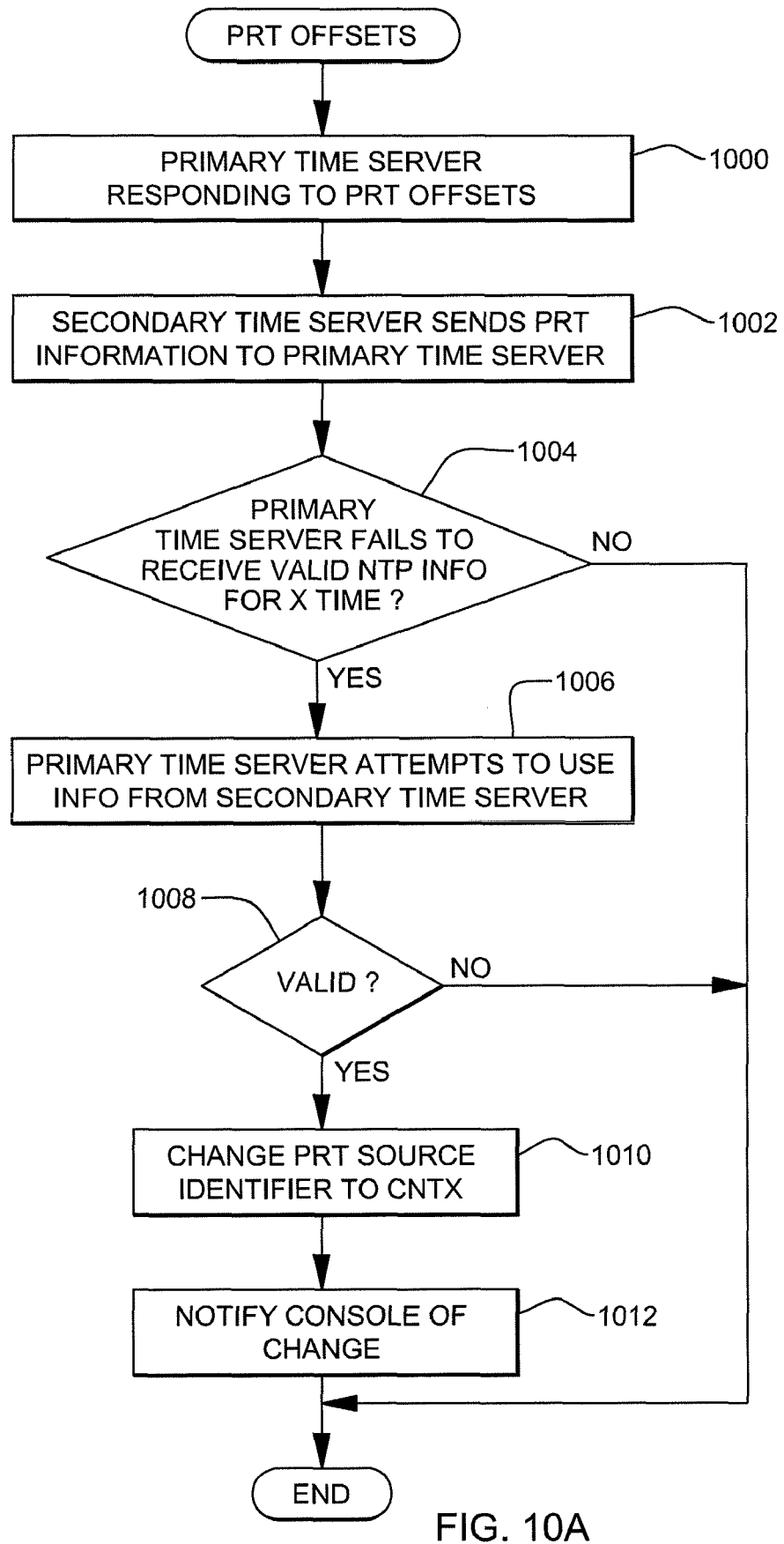
FIG. 10A depicts one example of the logic associated with a primary time server responding to Primary Reference Time (PRT) offsets, in accordance with an aspect of the present invention.

In addition to the above, there is also the case in which the primary time server is not using a PPS signal, but is, instead, responding to PRT offsets calculated by the console using data from NTP packets provided by a time code receiver. If the primary time server fails to receive a Set PPS Information or Set PRT command from the console that includes valid NTP information for two PRT update periods, as an example, then the primary time server will elect to use secondary NTP information, if the NTP information it has received from a secondary time server is valid and was received within the most recent PRT update period. The command request block of the Secondary PPS Information message command includes the information needed by the primary time server to perform conventional PRT offset correction, that is, the type of PRT offset correction steering that does not involve a PPS signal or a PPS port. The command request block includes the PRT offset, the PRT source identifier, the PRT dispersion, the PRT timestamp and the console dispersion. Thus, a primary time server that experiences a PPS mode failure involving loss of communication with its own console (with the result that no Set PRT or Set PPS Information commands are being received) and that is unable for whatever reason to make use of the PPS information that a secondary time server may or may not be providing will nevertheless be able to at least keep the CTN in NTP mode (with PRT source identifier equal to CNTX) by using the secondary NTP information transmitted from the secondary time server by means of the Secondary PPS Information message command. This is accomplished without a potentially disadvantageous transfer of the role of current time server from the primary time server to the secondary time server. This processing is described further with reference to FIG. 10A.

The primary time server is responding to PRT offsets, instead of using a PPS signal, STEP 1000. In this case, the CTN is said to be in the CNTP mode. When a secondary time server receives PRT information only, without PPS information, it sends the information to the primary time server using the Secondary PPS Information message command, as an example, STEP 1002. If the primary time server fails to receive a Set PPS information or Set PRT command from the console containing valid NTP information for a predefined period of time (e.g., two PRT updates), INQUIRY 1004, the primary time server elects to use secondary NTP information, if the NTP information as received from a secondary time server is valid and was received within the most recent PRT update, INQUIRY 1008. If it is valid, then the primary time server performs the CTN primary update procedure to change the PRT source identifier from CNTP to CNTX, STEP 1010. Further, an STP event notification command is issued to the console with the event code set to "secondary server PRT", when information from a secondary time server is used to determine PRT, STEP 1012. If the information is not valid, INQUIRY 1008, then the source identifier is not changed.

Figure 10B:
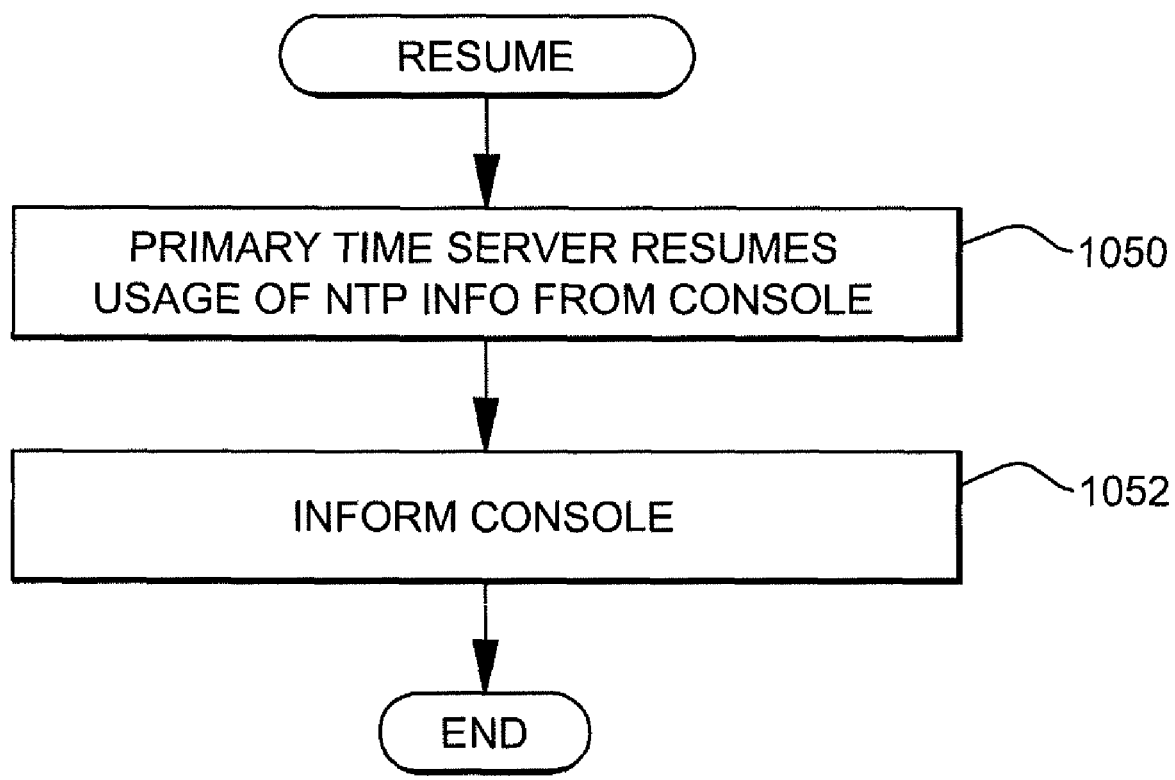
FIG. 10B depicts one embodiment of the logic associated with the primary time server resuming usage of Network Time Protocol (NTP) information from a console, in accordance with an aspect of the present invention.

As described with reference to FIG. 10B, the primary time server resumes usage of NTP information from its console when it receives a Set PPS Information or Set PRT command from the console containing valid information, STEP 1050. Thereafter, the console is informed via, for instance, an STP event notification command, STEP 1052. In this example, the event code is set to "secondary server PRT discontinued", when information from a secondary time server is no longer being used to determine PRT at the primary time server.

Described in detail above is a capability for enabling a primary time server to remain as current time server, even if unable to obtain desired timing information from its time code receivers. The primary time server obtains the information from a secondary time server that has its own time code receiver(s). The secondary time server provides this information to the primary time server, instead of taking over as current time server.

In a further aspect of the present invention, when a server itself is failing, the server recognizes this and passes its responsibility onto another server. In particular, if the server is in danger of dropping out of the network because, for instance, it loses its power source, a supplied battery may provide enough time for the server to indicate to the other servers it is about to leave the network and they should suspend normal recovery protocols and persist as a CTN without that server. Thus, in accordance with an aspect of the present invention, a recovery protocol is redefined when a server is in danger of disappearing and it is aware of it. The steps taken depend on whether the server that is failing is the primary time server or the secondary time server and the type of configuration. This is described in further detail below.

As one example, when the server is the active stratum-1 server, activation of an internal battery feature (IBF) at the active stratum-1 server in a Coordinated Timing Network is interpreted as the signal that the role of the active stratum-1 server for the CTN is to be transferred to the inactive stratum-1 server, which is also commonly referred to as the backup server. As a further example, given that the power failure occurs at the inactive stratum-1 server, activation of the internal battery feature at the server is interpreted as the signal that the normal rules for recovery are to be suspended so that loss of the inactive stratum-1 server will not lead to loss of the active stratum-1 server as well.

Activation of the internal battery feature occurs, in one example, as the result of a power outage and indicates the potential for complete outage at the server if power is not restored within, for example, one to ten minutes, depending on the quality of the IBF and on the power needs of facilities installed at the server. By taking advantage of the extra time afforded by the switch to battery power, the STP facility is able to transfer control of the CTN from the active stratum-1 server to a server that will not be affected by the power outage or to suspend the normal rules of recovery in order to prevent an outage at the inactive stratum-1 server from causing the active stratum-1 server to give up its role as the primary time server for the CTN. Thus, even though one or more servers may be lost from the CTN as a result of the outage, the remaining servers in the CTN continue to maintain synchronization. This is described in further detail below, in which one example is provided.

A change occurs to the operating state of one of the servers in the CTN:

- A server enters internal battery (IB) mode or the imminent server disruption state from normal operating mode;
- A server returns to normal operating mode from internal battery mode or from the imminent server disruption state; or
- A server enters the imminent server disruption state from internal battery mode.

(The console does not notify the STP facility at a server if the server enters internal battery mode from the imminent server disruption state, in this example.)

The console at that server issues a Server State Change Notification command to the server with the server state change code (SSCC) equal to one of the following values: 0—Unknown operating mode; 1—Normal operating mode; 2—Internal battery mode; and 3—Imminent server disruption; and with the server state change timestamp equal to the time at which the server state change occurred.

The server notifies each of its attached servers of the change to its operating state by sending each of its attached servers the Server State Change Notification command with the same server state change code and server state change timestamp values it received from the console. (Note that, in this example, every server in the CTN takes this action. It is not restricted only to the active stratum-1 server and the inactive stratum-1 server.)

If this server is the inactive stratum-1 server and it is specified as the primary stratum-1 server for the CTN, then a determination is made as to whether the console has indicated that this server has returned to normal operating mode. If so, the IB transition delay "re-takeover" timer is started using the standard timeout value (IBT_TOV) minus the time that has elapsed since the state change occurred based on the server state change timestamp in the Server State Change Notification console command.

If, however, this server is the inactive stratum-1 server and it is specified as the primary stratum-1 server, but the console has not indicated that this server has returned to normal operating mode, then if the IB transition delay "re-takeover" timer is active, the IB transition delay "re-takeover" time is reset.

When the Server State Change Notification command arrives at the active stratum-1 server from the inactive stratum-1 server, if the inactive stratum-1 server indicates that it has entered internal battery mode, then the IB transition delay "disable stratum-1 recovery" timer is started using the standard timeout value (IBT_TOV) minus the time that has elapsed since the state change occurred based on the server state change code timestamp in the Server State Change Notification command received from the inactive stratum-1 server.

However, if the inactive stratum-1 server does not indicate that it has entered internal battery mode, then if the inactive stratum-1 server indicates that it has left internal battery mode and the IB transition delay "disable stratum-1 recovery" timer is active, the IB transition delay "disable stratum-1 recovery" timer is reset. Thereafter, or if the inactive stratum-1 server does not indicate that it has left internal battery mode and the IB transition delay "disable stratum-1 recovery time" is active, if the inactive stratum-1 server indicates that it has entered normal operating mode and the stratum-1 recovery is disabled for the CTN and either: the CTN configuration is a dual server configuration or the CTN configuration is a triad configuration and the arbiter is in the attached state with the active stratum-1 server and the arbiter, and the arbiter is in normal operating mode, then the active stratum-1 server uses the stratum-1 recovery enable/disable procedure to re-enable stratum-1 recovery for the CTN.

When the Server State Change Notification command arrives at the inactive stratum-1 server from the active stratum-1 server, if the active stratum-1 server indicates that it has entered internal battery mode, then the IB transition delay "inactive stratum-1 must take over the CTN" timer is started using the standard timeout value (IBT_TOV) minus the time that has elapsed since the state change occurred based on the server state change code timestamp in the Server State Change Notification command received from the active stratum-1 server.

However, if the active stratum-1 server does not indicate that it has entered internal battery mode, and if the active stratum-1 server indicates that it has left internal battery mode and the IB transition delay "inactive stratum-1 must take over the CTN" timer is active, then the IB transition delay "inactive stratum-1 must take over the CTN" timer is reset.

If either the IB transition delay "disable stratum-1 recovery" timer (which was started earlier when the active stratum-1 server was notified by the inactive stratum-1 server that the inactive stratum-1 server had entered internal battery mode) expires at the active stratum-1 server, or the active stratum-1 server receives a Server State Change Notification command from the inactive stratum-1 server indicating that the inactive stratum-1 server has entered the imminent server disruption state, then if the active stratum-1 server is in normal operating mode, and if either the CTN configuration is a dual server configuration or the CTN configuration is a triad configuration and either the arbiter is not in the attached state with the active stratum-1 server or the arbiter is not in normal operating mode, then the active stratum-1 server uses the stratum-1 recovery enable/disable procedure to disable stratum-1 recovery for the CTN.

If either the IB transition delay "inactive stratum-1 server must take over the CTN" timer (which was started earlier when the inactive stratum-1 server was notified by the active stratum-1 server that the active stratum-1 server had entered internal battery mode) expires at the inactive stratum-1 server, or the inactive stratum-1 server receives a Server State Change Notification command from the active stratum-1 server indicating that the active stratum-1 server has entered the imminent server disruption state, and if the inactive stratum-1 server is not in the imminent server disruption state, or the inactive stratum-1 server is not in internal battery mode and the active stratum-1 server is in a state other than the imminent server disruption state, then at this point, either the inactive stratum-1 server is in normal operating mode and the active stratum-1 server is not in normal operating mode, or the inactive stratum-1 server is in internal battery mode and the active server is in the imminent server disruption state.

Further, if either the CTN configuration is not a dual server configuration or the CTN configuration is not a triad configuration, then the inactive stratum-1 server issues a Request Stratum-1 Configuration Change message command to the active stratum-1 server. However, if either the CTN configuration is a dual server or a triad configuration, the inactive stratum-1 server prepares to issue the Request Stratum-1 Configuration Change message command to the active stratum-1 server to modify the stratum-1 configuration to allow the inactive stratum-1 server to take over as the active server for the CTN.

Moreover, if either the CTN configuration is a dual server configuration or the CTN configuration is a triad configuration and either the arbiter is not in the attached state with the inactive stratum-1 server or the arbiter is not in normal operating mode, then the inactive stratum-1 server includes in the Request Stratum-1 Configuration Change message command an indication that the active stratum-1 server is to use the stratum-1 recovery enable/disable procedure to disable stratum-1 recovery for the CTN before it, the active stratum-1 server, modifies the stratum-1 configuration to allow the inactive stratum-1 server to take over as the active stratum-1 server for the CTN. Thereafter or otherwise, the inactive stratum-1 server issues the Request Stratum-1 Configuration Change message command to the active stratum-1 server. One example of a Request Stratum-1 Configuration Change command is described in U.S. Patent Publication No. 2008/0183899A1 entitled "Server Time Protocol Messages and Methods," Carlson et al., published Jul. 31, 2008, which is hereby incorporated herein by reference in its entirety.

When the IB transition delay "re-takeover" timer expires, this server is the inactive stratum-1 server and it is specified as the primary stratum-1 server for the CTN and it has returned to normal operating mode and the required time interval has elapsed since the return to normal operating mode occurred.

This server issues a Read Network Node List message command to the active stratum-1 server to determine if the servers attached to the active stratum-1 server are a subset of the servers attached to this server.

If the response to the Read Network Node List message command from the active stratum-1 server indicates that the servers attached to the active stratum-1 server are in fact a subset of the servers attached to this server, then this server issues a Request Stratum-1 Configuration Change message command to the active stratum-1 server specifying this server as the new active stratum-1 server for the CTN.

As described above, a situation is handled in which the inactive stratum-1 server is to, under certain circumstances (1) issue a Request Stratum-1 Configuration Change message command to the active stratum-1 server to modify the stratum-1 configuration to allow the inactive stratum-1 server to take over as the active stratum-1 server for the CTN and is to at the same time (2) specify that that stratum-1 recovery enable/disable procedure be performed to disable stratum-1 recovery for the CTN before the configuration change procedure occurs. A change to the new stratum-1 configuration information block allows these two requests to be combined into a single use of the Request Stratum-1 Configuration Change message command. When the active stratum-1 server receives a New Stratum-1 Configuration Information Block (NSCIB) (with a disable stratum-1 recovery indicator) in a Request Stratum-1 Configuration Change message command, this indicator, when set to one, indicates that the sending server is requesting that stratum-1 recovery be disabled for the CTN. When the indicator is zero, no such action is indicated.

The NSCIB also includes an enable stratum-1 recovery (E) indicator that indicates that stratum-1 recovery is to be enabled when the stratum-1 configuration specified by the NSCIB becomes current. When set to zero, the indicator indicates that no change to the stratum-1 recovery state is to occur when the stratum-1 configuration specified by the NSCIB becomes current.

In the case of a triad CTN configuration in which the inactive stratum-1 server has entered IBF mode, for normal stratum-1 recovery to remain viable, the arbiter must still be active. If the active stratum-1 server were to lose contact with the arbiter at about the same time that it lost contact with the inactive stratum-1 server, the stratum-1 recovery rules indicate that the active stratum-1 server is to drop to stratum zero and give up its role as the primary time server for the CTN. The result would be that the CTN as a whole would lose synchronization. That is why the active stratum-1 server in a triad CTN configuration is to disable stratum-1 recovery if it learns that the inactive stratum-1 server has entered IBF mode and the arbiter is either no longer connected to the active stratum-1 server or is no longer in normal operating mode—implying that it could lose its connection to the active stratum-1 server at any moment.

Similarly, if the active stratum-1 server in a triad CTN configuration signals the inactive stratum-1 server that it, the active stratum-1 server, has entered IBF mode, the normal stratum-1 recovery rules could cause trouble when the inactive stratum-1 server attempts to take over as the primary time server for the CTN if the arbiter does not remain active and in contact with the inactive stratum-1 server when the takeover occurs. If, following the takeover, the once inactive stratum-1 server and now active stratum-1 server were to determine that it had lost contact not just with the once active stratum-1 server and now inactive stratum-1 server but also with the arbiter, the once inactive stratum-1 server and now active stratum-1 server would, according to the stratum-1 recovery rules, drop to stratum zero and give up its role as primary time server for the CTN. Again, the result would be that the CTN as a whole would lose synchronization. That is why the inactive stratum-1 server in a triad CTN configuration is to specify that stratum-1 recovery be disabled before the requested stratum-1 configuration change occurs if it determines not only that the active stratum-1 server has entered IBF mode but also that the arbiter either is no longer connected to the inactive stratum-1 server or is no longer in normal operating mode—implying that it could lose its connection to the inactive stratum-1 server at any moment.

In the case of a dual server CTN configuration, the reason for disabling stratum-1 recovery when either the active stratum-1 server or the inactive stratum-1 server enters IBF mode is more subtle. When one server terminates connectivity with another server, it is common for offline signals to be exchanged between the two servers. It is possible for these offline signals to be misinterpreted by the active stratum-1 server as the "stratum-1 system check signal", which signifies that the active stratum-1 server has entered a state that prevents it from continuing to act as the primary time server for the CTN. In order to prevent any possibility that offline signals generated by the loss of the inactive stratum-1 server might mistakenly cause the active stratum-1 server to give up its role as the CTN's primary time server, stratum-1 recovery is to be disabled when either the of the two servers enters IBF mode.

One example of the stratum-1 recovery disable/enable procedure referred to above is implemented, as follows:

Stratum-1 recovery is enabled or disabled in a CTN when the active stratum-1 server performs the CTN parameter update procedure using a format-3 update based on a stratum-1 recovery block. The stratum-1 recovery block includes, for instance, a current stratum-1 recovery state (C) indicator, a new stratum-1 recovery state (N) indicator, and a stratum-1 recovery state update time. Stratum-1 recovery is disabled in a CTN by performing the CTN parameter update procedure with the new stratum-1 recovery state (N) indicator in the stratum-1 recovery block set to one, which signifies that stratum-1 recovery is to be disabled at the time specified by the stratum-1 recovery state update time. When stratum-1 recovery is disabled, the active stratum-1 server does not surrender its stratum-1 status and the inactive stratum-1 server does not initiate an active stratum-1 takeover in response to events within the CTN that would normally result in recovery actions as specified for the dual server and triad configurations. Stratum-1 recovery is re-enabled in a CTN by performing the CTN parameter update procedure with the new stratum-1 recovery state (N) indicator in the stratum-1 recovery block set to zero, which signifies that the CTN is to operate with stratum-1 recovery enabled starting at the time specified by the stratum-1 recovery state update time.

A format-3 update is performed by issuing format-3 XTP message responses to all XTP message commands for a minimum period of time that is equal to the CTN maximum freewheel interval. This period is defined as the format 3-update interval. The stratum-1 recovery block described above constitutes the CTN parameter update information of the format-3 data in the XTP message response. The format-3 update is considered complete at the end of the format-3 update interval. The update is considered to be in progress until the update completes. When a format-3 update is initiated, the stratum-1 recovery state update time in the stratum-1 recovery block is set to the current time plus the CTN maximum freewheel interval. While a format-3 update is in progress, new CTN updates are not initiated.

The definition of the CTN-parameter code used in the command request block and the command response block of the Read CTN Parameters message command includes, for instance, a value of "4" to specify "read general2 CTN parameters". When the read CTN parameters message command is issued with the CTN parameter code equal to "read general2 CTN parameters", the operation dependent area of the command response block includes the new stratum-1 recovery block.

The response block of the Read CTN Parameters console command accommodates the new "recovery disabled" state. When this bit is one, stratum-1 recovery is disabled for the CTN. When the bit is zero, stratum-1 recovery is enabled for the CTN. The stratum-1 recovery block is not returned in the response block of the Read CTN Parameters console command.

A Read Server State message command allows a server to obtain the operating state of an attached server from the attached server in question.

Described in detail above is one example of determining that a server is unreliable and taking actions, in response to that determining, to maintain synchronization within the CTN.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 11:
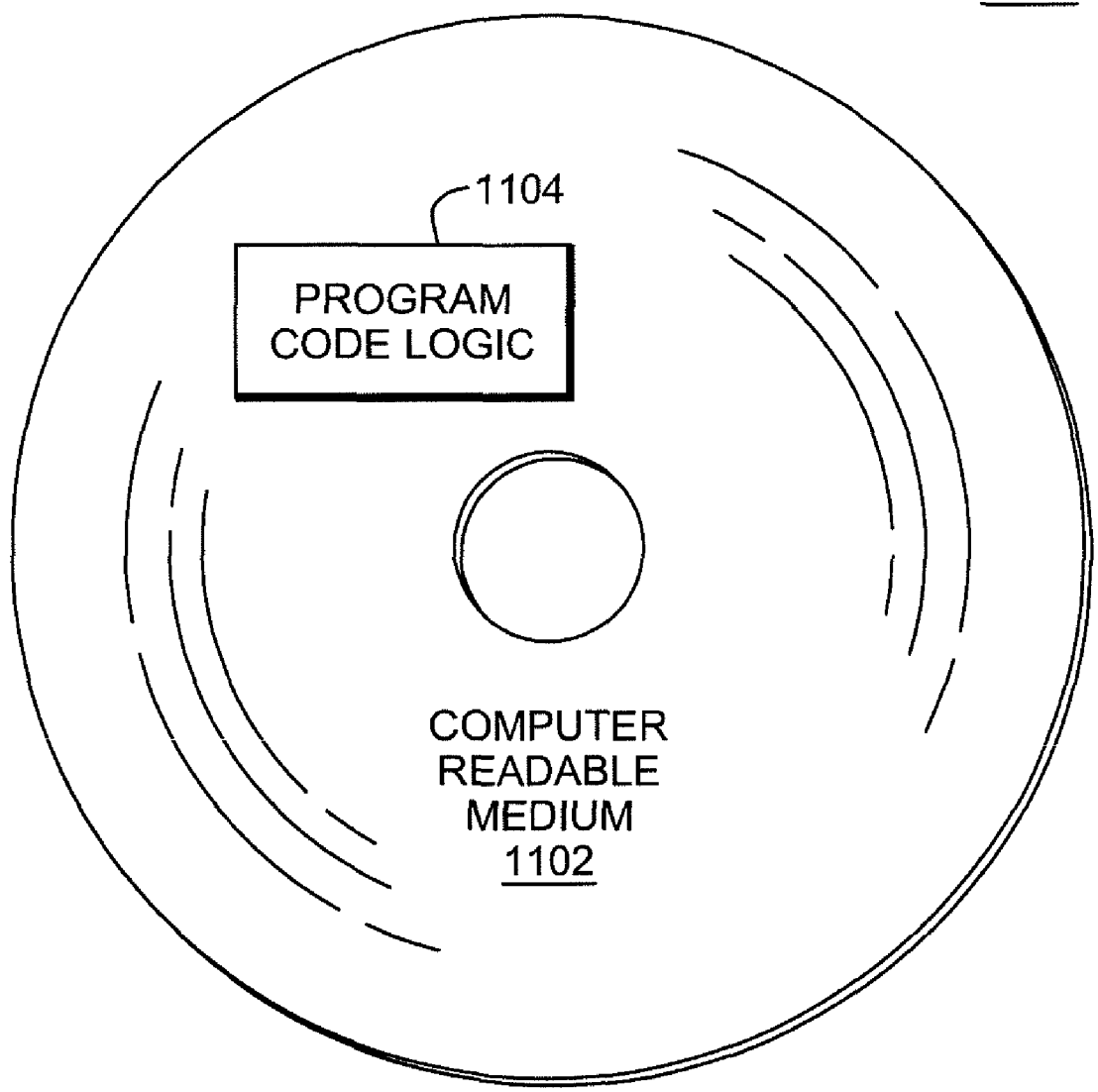
FIG. 11 depicts one embodiment of a computer program product incorporating one or more aspects of the present invention.

One example of an article of manufacture or a computer program product incorporating one or more aspects of the present invention is described with reference to FIG. 11A computer program product 1100 includes, for instance, one or more computer usable media 1102 to store computer readable program code means or logic 1104 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided that enables a primary time server to remain as current time server, even in response to an indication that time code information supplied directly to the primary time server (e.g., information supplied by a time code receiver and/or a console in the vicinity of the primary time server, as opposed to information supplied indirectly by a secondary time server) is unavailable (e.g., time code receivers of the primary time server have failed; PPS information of the primary time server is unavailable, even though primary NTP information may be available; no usable time code information is available; no desired time code information is available; etc.). Instead, the primary time server receives the desired timing information from a secondary time server. This is in lieu of the secondary time server taking over as the primary time server.

Although various embodiments are described above, these are only examples. Many variations are possible without departing from the spirit of the present invention. For example, a Coordinated Timing Network to incorporate and use one or more aspects of the present invention can include more or fewer servers than described in the examples herein. Further, the servers may be in a different configuration and/or the servers may be based on other than the z/Architecture®. Further, the time code receivers used may be different than those described herein and there may be more or fewer time code receivers for each server. In a further example, the time code receivers of the secondary time server are at a different distance (e.g., closer, further away) from the primary time server than the example described herein. Yet further, the request and response blocks provided herein may include more, less or different information than described herein. Further, each of the fields may be in a different order or may be of a different size than described herein. Many other variations are also possible for the request/response blocks, as well as the commands that are described herein. Further, the timing information that is provided to the primary time server may be different than described herein. Again, many other variations are possible.

The term "obtaining" as used herein includes, but is not limited to, receiving, retrieving, being provided, being sent, having, being forwarded, as examples.

In addition to the above, an environment to incorporate and use one or more aspects of the present invention may include an emulator (e.g., software or other emulation mechanisms), in which a particular architecture (including, for instance, instruction execution; architected functions, such as address translation; and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product to facilitate the providing of timing information to primary time servers of coordinated timing networks, the computer program product comprising:
    a storage medium readable by a processing circuit and storing instructions for execution by the processing circuit for performing a method comprising:
        obtaining by a primary time server of a coordinated timing network time code information from a secondary time server; and
        employing by the primary time server the time code information from the secondary time server to provide time synchronization in the coordinated timing network, wherein the employing of the time code information from the secondary time server is in response to an indication that time code information of the primary time server is unavailable, and wherein the primary time server remains as current time server of the coordinated timing network, instead of having the secondary time server take over as the current time server.

2. The computer program product of claim 1, wherein the time code information includes pulse-per-second information.

3. The computer program product of claim 1, wherein the time code information includes network time protocol information.

4. The computer program product of claim 1, further comprising:
    obtaining by the secondary time server the time code information using a time code receiver coupled to the secondary time server; and
    forwarding at predefined intervals the time code information from the secondary time server to the primary time server.

5. The computer program product of claim 4, wherein the primary time server receives the time code information from the secondary time server absent a request for the time code information from the secondary time server.

6. The computer program product of claim 4, wherein the forwarding comprises using a secondary PPS information message command to provide the time code information to the primary time server.

7. The computer program product of claim 4, wherein the obtaining the time code information by the secondary time server comprises employing at least one of a Set PPS Information command or a Set PRT command to provide the time code information to the secondary time server.

8. The computer program product of claim 1, wherein the primary time server has associated therewith one or more time code receivers used to obtain time code information, and wherein the employing is in response to failure of the one or more time code receivers of the primary time server.

9. The computer program product of claim 8, wherein the secondary time server has a time code receiver associated therewith, and wherein the obtaining comprises:
    using the time code receiver of the secondary time server to obtain the time code information of the secondary time server; and
    providing the time code information of the secondary time server to the primary time server.

10. The computer program product of claim 1, wherein the time code information of the secondary time server comprises a pulse-per-second offset, and wherein the pulse-per-second offset is defined as a pulse-per-second offset at the secondary time server minus coordinated server time offset at the secondary time server.

11. A system of facilitating the providing of timing information to primary time servers of coordinated timing networks, said system comprising:
- a primary time server of a coordinated timing network; and
- a secondary time server of the coordinated timing network coupled to the primary time server, wherein the system is capable of performing a method comprising:
  - obtaining by the primary time server time code information from the secondary time server; and
  - employing by the primary time server the time code information from the secondary time server to provide time synchronization in the coordinated timing network, wherein the employing of the time code information from the secondary time server is in response to an indication that time code information of the primary time server is unavailable, and wherein the primary time server remains as current time server of the coordinated timing network, instead of having the secondary time server take over as the current time server.

12. The system of claim 11, further comprising:
- obtaining by the secondary time server the time code information using a time code receiver coupled to the secondary time server; and
- forwarding at predefined intervals the time code information from the secondary time server to the primary time server.

13. The system of claim 12, wherein the primary time server receives the time code information from the secondary time server absent a request for the time code information from the secondary time server.

14. The system of claim 12, wherein the forwarding comprises using a secondary PPS information message command to provide the time code information to the primary time server.

15. The system of claim 11, wherein the primary time server has associated therewith one or more time code receivers used to obtain time code information, and wherein the employing is in response to failure of the one or more time code receivers of the primary time server.

16. The system of claim 15, wherein the secondary time server has a time code receiver associated therewith, and wherein the obtaining comprises:
- using the time code receiver of the secondary time server to obtain the time code information of the secondary time server; and
- providing the time code information of the secondary time server to the primary time server.

17. The system of claim 11, wherein the time code information of the secondary time server comprises a pulse-per-second offset, and wherein the pulse-per-second offset is defined as a pulse-per-second offset at the secondary time server minus coordinated server time offset at the secondary time server.

18. A method of facilitating the providing of timing information to primary time servers of coordinated timing networks, said method comprising:
- obtaining by a primary time server of a coordinated timing network time code information from a secondary time server; and
- employing by the primary time server the time code information from the secondary time server to provide time synchronization in the coordinated timing network, wherein the employing of the time code information from the secondary time server is in response to an indication that time code information of the primary time server is unavailable, and wherein the primary time server remains as current time server of the coordinated timing network, instead of having the secondary time server take over as the current time server.

19. The method of claim 18, further comprising:
- obtaining by the secondary time server the time code information using a time code receiver coupled to the secondary time server; and
- forwarding at predefined intervals the time code information from the secondary time server to the primary time server.

20. The method of claim 18, wherein the time code information of the secondary time server comprises a pulse-per-second offset, and wherein the pulse-per-second offset is defined as a pulse-per-second offset at the secondary time server minus coordinated server time offset at the secondary time server.

* * * * *